(12) United States Patent
Taguchi et al.

(10) Patent No.: US 10,023,144 B2
(45) Date of Patent: Jul. 17, 2018

(54) AIRBAG DEVICE

(71) Applicant: Autoliv Development AB, Vårgårda (SE)

(72) Inventors: Hiroyuki Taguchi, Yokohama (JP); Kai Maenishi, Yokohama (JP); Tomohiro Sumiya, Yokohama (JP); Akira Kawamoto, Yokohama (JP); Yutaka Nakajima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 13 days.

(21) Appl. No.: 15/322,010

(22) PCT Filed: May 22, 2015

(86) PCT No.: PCT/JP2015/064813
§ 371 (c)(1),
(2) Date: Dec. 23, 2016

(87) PCT Pub. No.: WO2016/002384
PCT Pub. Date: Jan. 7, 2016

(65) Prior Publication Data
US 2017/0129439 A1   May 11, 2017

(30) Foreign Application Priority Data

Jun. 30, 2014 (JP) ................................. 2014-134668
Jul. 24, 2014 (JP) ................................. 2014-150735

(51) Int. Cl.
*B60R 21/205* (2011.01)
*B60R 21/231* (2011.01)
(Continued)

(52) U.S. Cl.
CPC .......... *B60R 21/205* (2013.01); *B60R 21/231* (2013.01); *B60R 21/235* (2013.01);
(Continued)

(58) Field of Classification Search
CPC . B60R 21/205; B60R 21/231; B60R 21/2338; B60R 2021/23386
(Continued)

(56) References Cited

U.S. PATENT DOCUMENTS 4,262,931 A     4/1981  Strasser et al.
6,726,245 B2 *  4/2004  Fellhauer ............ B60R 21/231
                                               280/728.2
(Continued)

FOREIGN PATENT DOCUMENTS

CA    1 160 657    1/1984
CA    2 584 099   10/2007
(Continued)

OTHER PUBLICATIONS

JPH0332956 cited on the IDS dated Dec. 23, 2016 translation attached.*
(Continued)

*Primary Examiner* — Faye M Fleming
(74) *Attorney, Agent, or Firm* — Brinks Gilson & Lione

(57) ABSTRACT

An airbag device for restraining an occupant even during an oblique collision and suppressing head injury values. An airbag device 100 includes: a passenger bag 112 which deploys on a front side of a passenger seat 104; a center bag 114 which deploys on an inner side in a vehicle width direction; a slit 128 which separates the passenger bag 112 and the center bag 114 from each other on a vehicle rearward side; and a tether belt 122 which which is connected to a first connecting part 124 on the center bag 114 and a second connecting part 126 on the passenger bag 112. The tether belt 122 is tensioned as the passenger bag 112 and the center bag 114 expand and deploy, and the center bag 114 restrains a side of the occupant head E1*a* while being supported by the tether belt 122.

22 Claims, 21 Drawing Sheets

(51) Int. Cl.
B60R 21/235 (2006.01)
B60R 21/239 (2006.01)
B60R 21/276 (2006.01)
B60R 21/2338 (2011.01)
B60R 21/00 (2006.01)

(52) U.S. Cl.
CPC ........ *B60R 21/239* (2013.01); *B60R 21/2338* (2013.01); *B60R 21/276* (2013.01); *B60R 2021/0009* (2013.01); *B60R 2021/0048* (2013.01); *B60R 2021/23107* (2013.01); *B60R 2021/23386* (2013.01); *B60R 2021/23509* (2013.01); *B60R 2021/23533* (2013.01); *B60R 2021/23576* (2013.01)

(58) Field of Classification Search
USPC .............................................. 280/729, 743.2
See application file for complete search history.

(56) References Cited

U.S. PATENT DOCUMENTS

| | | | |
|---|---|---|---|
| 6,883,832 B2 * | 4/2005 | Keutz | B60R 21/203 280/729 |
| 7,152,880 B1 | 12/2006 | Pang et al. | |
| 7,360,790 B2 * | 4/2008 | Hasebe | B60R 21/233 280/743.2 |
| 8,882,138 B1 | 11/2014 | Hicken et al. | |
| 2002/0135164 A1 | 9/2002 | Thomas | |
| 2003/0115945 A1 | 6/2003 | Kazubhiro | |
| 2003/0218325 A1 | 11/2003 | Hasebe et al. | |
| 2003/0230883 A1 * | 12/2003 | Heym | B60R 21/233 280/743.1 |
| 2004/0051285 A1 | 3/2004 | Fischer | |
| 2005/0029779 A1 | 2/2005 | Bito et al. | |
| 2005/0230945 A1 | 10/2005 | Watanabe | |
| 2006/0186656 A1 | 8/2006 | Kumagai | |
| 2010/0090445 A1 | 4/2010 | Williams et al. | |
| 2013/0001934 A1 | 1/2013 | Nagasawa et al. | |
| 2014/0361521 A1 | 12/2014 | Fukawatase | |
| 2015/0321636 A1 * | 11/2015 | Jang | B60R 21/233 280/743.2 |
| 2017/0101071 A1 * | 4/2017 | Kruse | B60R 21/0136 |
| 2017/0129444 A1 * | 5/2017 | Fukawatase | B60R 21/233 |
| 2017/0136981 A1 * | 5/2017 | Fukawatase | B60R 21/233 |

FOREIGN PATENT DOCUMENTS

| | | |
|---|---|---|
| CN | 1459394 A | 12/2003 |
| CN | 1824548 A | 8/2006 |
| CN | 1951732 A | 4/2007 |
| CN | 200985009 Y | 12/2007 |
| CN | 200985010 Y | 12/2007 |
| CN | 102849017 A | 6/2011 |
| CN | 102186702 A1 | 9/2011 |
| DE | 602 04 277 T2 | 11/2005 |
| DE | 10 2007 032 763 A1 | 1/2008 |
| DE | 10 2012 018 450 A1 | 3/2014 |
| EP | 1 364 838 A2 | 5/2003 |
| EP | 1 398 228 A2 | 3/2004 |
| EP | 1 498 320 A2 | 1/2005 |
| EP | 1 775 176 A1 | 4/2007 |
| EP | 1 775 177 A1 | 4/2007 |
| EP | 1 842 742 A2 | 10/2007 |
| EP | 1 693 256 B1 | 8/2008 |
| EP | 2 799 292 A1 | 11/2014 |
| JP | 56-67649 | 6/1981 |
| JP | 3-32956 | 2/1991 |
| JP | 4-55141 | 2/1992 |
| JP | 5-65706 | 8/1993 |
| JP | 6-72276 | 3/1994 |
| JP | 6-80057 | 3/1994 |
| JP | 8-72261 | 3/1996 |
| JP | 8-268204 | 10/1996 |
| JP | 10-71920 | 3/1998 |
| JP | 2000-280845 | 10/2000 |
| JP | 2003-182500 | 7/2003 |
| JP | 2003-335203 | 11/2003 |
| JP | 2004-262432 | 9/2004 |
| JP | 2005-88681 | 4/2005 |
| JP | 2005-247118 | 9/2005 |
| JP | 2006-88856 | 4/2006 |
| JP | 2006-256508 | 9/2006 |
| JP | 2006-327505 | 12/2006 |
| JP | 2007-112427 | 5/2007 |
| JP | 2007-112430 | 5/2007 |
| JP | 2007-216733 | 8/2007 |
| JP | 2007-276771 | 10/2007 |
| JP | 2008-44594 | 2/2008 |
| JP | 2008-114615 | 5/2008 |
| JP | 2008-179173 | 8/2008 |
| JP | 2009-61882 | 3/2009 |
| JP | 2009-120114 | 6/2009 |
| JP | 2009-227180 | 10/2009 |
| JP | 2010-201980 | 9/2010 |
| JP | 2012-56371 | 3/2012 |
| JP | 2012-505783 | 3/2012 |
| JP | 2013-14176 | 1/2013 |
| JP | 2013-35473 | 2/2013 |
| JP | 2013-112276 | 6/2013 |
| JP | 2014-121965 | 7/2014 |
| KR | 10-2007-0042093 | 4/2007 |
| KR | 2007-0052192 | 5/2007 |
| KR | 2011-0071076 | 6/2011 |
| MX | 2007003946 A | 11/2008 |
| WO | WO 2010/045040 A1 | 10/2009 |
| WO | WO 2013/099036 A1 | 7/2013 |

OTHER PUBLICATIONS

PCT International Search Report—dated Jun. 23, 2015.
PCT International Search Report—dated Oct. 6, 2015.

* cited by examiner

PRIOR ART

PRIOR ART (ROTATES AFTER COLLISION)

PRIOR ART

VIEW OF ARROW A

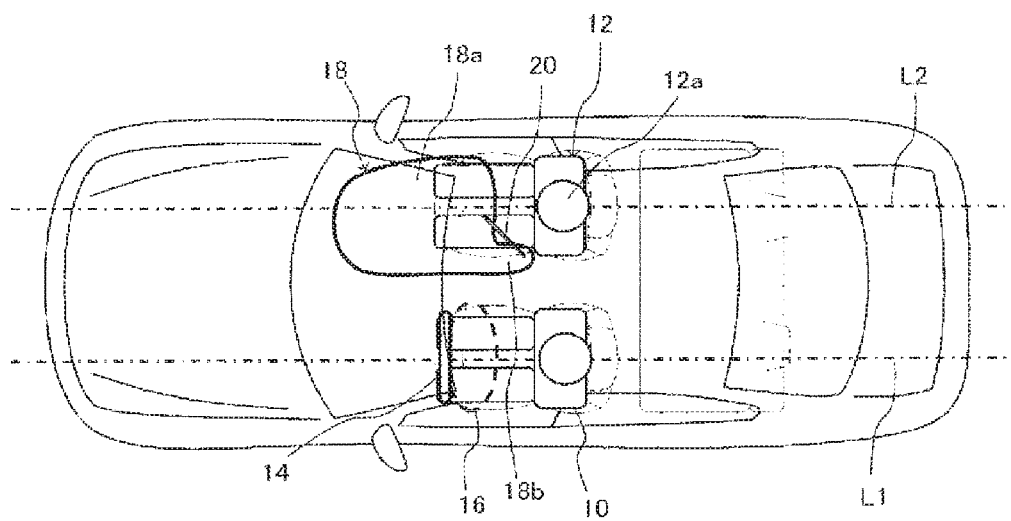
FIG. 16
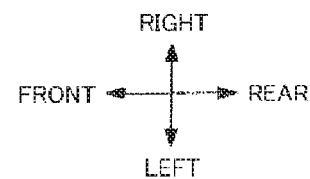

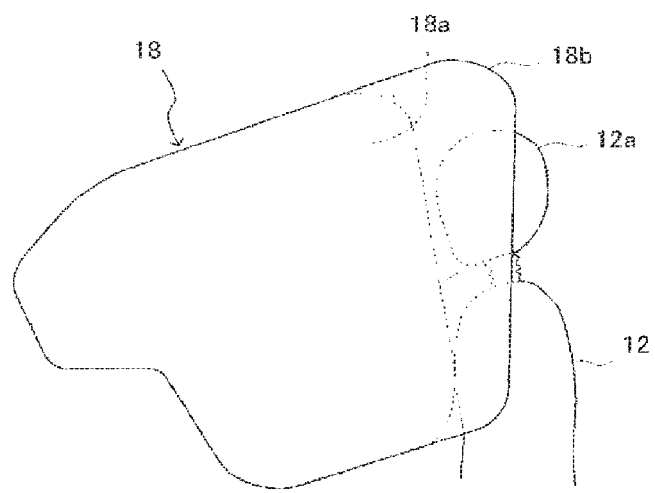
FIG. 18
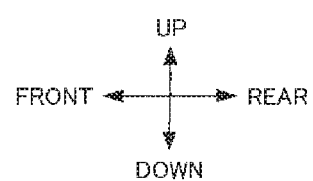

AIRBAG DEVICE

CROSS REFERENCE TO RELATED APPLICATIONS

This application claims priority to Japanese Patent Application Nos. 2014-134668, filed on Jun. 30, 2014, 2014-150735, filed on Jul. 24, 2014, and PCT/JP2015/064813, filed on May 22, 2015.

FIELD OF THE INVENTION

The present invention relates to an airbag device which protects an occupant inside a vehicle by deploying an airbag. In particular, the present invention relates to a passenger seat airbag device which is arranged inside an instrument panel of a vehicle and which mainly protects an occupant in a passenger seat from the front of the vehicle.

BACKGROUND

Airbag devices have almost become standard equipment in recent vehicles. An airbag device is a safety device which operates during an emergency such as a vehicle collision and which expands and deploys under gas pressure to receive and protect an occupant. Airbag devices come in various types in accordance with installation locations or applications. For example, in order to protect occupants of front seats from impact mainly in a longitudinal direction (i.e. frontal impacts), a driver's seat is provided with a front airbag at a center of a steering wheel while a passenger airbag is provided in a vicinity of a passenger seat inside an instrument panel or at another location. In addition, in order to protect respective occupants of front and back row seats from a side collision or from a subsequently occurring rollover (overturn), a curtain airbag which expands and deploys along a side window is provided in a vicinity of a ceiling of a wall part, and a side airbag which expands and deploys to an immediate side of an occupant is provided in a side part of a seat.

Generally, a passenger seat airbag device adopts a structure in which an inflator that generates expansion gas and an airbag that expands and deploys due to the gas are housed inside an instrument panel. During a collision of a vehicle, the inflator operates to expand the airbag, and the airbag deploys toward the inside of the vehicle to restrain a forward movement of an occupant.

In airbag development, there are constant demands for improving occupant restraining performance. For example, a passenger seat airbag device disclosed in Japanese Patent Application Laid-open No. 2006-88856 is configured such that shapes of left and right expanding portions in a vehicle width direction differ from each other. In the above cited reference, since shapes and positions (shapes inside cabin) of various windows and pillars are bilaterally asymmetrical from the perspective of an occupant sitting on a seat, occupant restraining performance is improved by giving left and right expanding portions different shapes in accordance with the bilateral asymmetry.

In addition, in recent years, enhanced occupant protection is increasingly being required in various collision modes including, in addition to a head-on collision in which a vehicle collides head-on with an obstacle (an oncoming vehicle or the like), a case where an obstacle collides with a part of a vehicle (an offset collision) and a case where a part of a vehicle collides with an obstacle from an oblique direction.

Referring to the appended drawings, FIG. 1 is a plan view which shows a structure of a conventional vehicle (a left-hand drive vehicle) including airbag devices for a driver's seat and a passenger seat and which shows a situation where the vehicle is approaching, at an angle of 0 degrees, an object (an obstacle) at a position deviated from directly in front. A driver's seat airbag 16 is housed inside a steering wheel 14 in front of a driver 10 and is configured to deploy toward an occupant when a collision occurs. A passenger seat airbag 18 is housed inside an instrument panel 24 in front of an occupant 12 of the passenger seat and is configured to deploy toward the occupant when a collision occurs. The airbags 14 and 18 are configured to expand due to expansion gas supplied from an inflator (not shown) which is operated by a signal of a collision sensor.

FIG. 2 is a plan view which shows a structure of a conventional vehicle mounted with airbag devices for a driver's seat and a passenger seat and which shows a situation where the vehicle is approaching, at a prescribed angle θ, an object (an obstacle) at a position deviated from directly in front. FIG. 3 shows a situation where a vehicle body rotates after colliding with the object (an obstacle) in the state shown in FIG. 2. In a situation such as that shown in FIG. 3, there is a risk that the occupant 12 of the passenger seat may slide across the side of passenger seat airbag 18 and collide with a center console between the driver's seat and the passenger seat. In this case, in addition to an injury caused by a direct collision with the center console, the occupant 12 may suffer brain damage due to a rotation of the head. A brain damage index thereof is referred to as BRIC (Brain Rotational Injury Criteria).

SUMMARY OF INVENTION

Modern airbag devices are required to be capable of accommodating irregular collisions and impact such as an offset collision (also referred to as an oblique collision) in which an impact is applied to a vehicle from an obliquely longitudinal direction. Even in an oblique collision, an airbag device with a shape biased left and right in a vehicle width direction such as that described in Japanese Patent Application Laid-open No. 2006-88856 can conceivably be utilized. However, in an oblique collision, an occupant enters the airbag device existing in front of a seat in an irregular behavior such as from an oblique direction. In such a case, an attitude of the airbag device may become unstable and cause a decline in occupant restraining ability or coming into contact with the airbag device in on oblique direction may increase an occupant injury value.

In consideration of such problems, an object of the present invention is to provide an airbag device which is capable of restraining an occupant in a stable attitude even during an oblique collision and which is capable of suppressing an injury value particularly for the head of the occupant. Another object is to provide an airbag device capable of effectively restraining, with a simple structure, an obliquely forward movement of an occupant and particularly a rotation of the head.

In order to solve the problems described above, a representative configuration of an airbag device according to the present invention is an airbag device which restrains an occupant on a passenger seat of a vehicle, the airbag device including: a passenger bag which has a bag shape and which expands and deploys on a front side of the passenger seat; a center bag which has a bag shape and which expands and deploys on an inner side in a vehicle width direction of the passenger bag; a slit which separates the passenger bag and the center bag from each other on a vehicle rearward side; and a tether belt which has a band shape and which is connected to a first connecting part in an upper part of the center bag on a vehicle rear side and to a second connecting part in an upper part of the passenger bag, wherein the tether belt is tensioned as the passenger bag and the center bag expand and deploy such that the first connecting part and the second connecting part move in directions separating from each other, and the center bag restrains a side of the head of the occupant while being supported by the tether belt.

In oblique collisions, there are cases where the occupant of the passenger seat moves obliquely forward on an inner side in the vehicle width direction (hereinafter, referred to as a "vehicle inner side" or "inboard side" in the present specification). In addition, in such cases, when the head of the occupant comes into contact with a conventional passenger bag existing in front of the passenger seat, a clockwise rotation with the neck as an axis when viewed from above may occur on the head. In the configuration described above, a center bag is provided on a vehicle inner side of the passenger bag and a slit is provided between the passenger bag and the center bag. According to this configuration, the head of the occupant moving obliquely forward on the vehicle inner side comes into contact with the center bag particularly from the side of the head before, at the same time as, or immediately after coming into contact with the passenger bag in front of the occupant. Subsequently, the head of the occupant is restrained so as to be guided into the slit while bringing the side of the head into contact with the center bag. With this configuration, the rotation of the head of the occupant can be reduced or canceled. In particular, since an angular velocity of the rotation of the head of the occupant can be reduced, an injury value resulting from the rotation can be suppressed.

In the configuration described above, the center bag is supported against the passenger bag by the tether belt. Therefore, even when the head of the occupant comes into contact with the center bag from an outer side in the vehicle width direction (hereinafter, referred to as a "vehicle outer side" or "outboard side" in the present specification), since a movement of the center bag toward the vehicle inner side with respect to the passenger bag is prevented and a narrowness of the slit is maintained, the head can be suitably guided into the slit and restrained.

The center bag described above may be provided so as to protrude more toward the vehicle rear side than the passenger bag. According to this configuration, the side of the head of the occupant can be more readily restrained by the center bag.

The center bag described above may be provided so as to protrude more toward the vehicle rear side than the passenger bag. In other words, a configuration may be adopted in which a rear end of the center bag is positioned more toward a vehicle front side than a rear end of the passenger bag. In addition, the rear end of the center bag may be provided at a same position in a vehicle longitudinal direction as the rear end of the passenger bag. Even with these configurations, when the occupant moves obliquely forward on the vehicle inner side, the slit is to exist at a destination of the movement and the head of the occupant is to be restrained so as to enter the slit. Therefore, even according to these configurations, a rotation of the head of the occupant can be canceled or an angular velocity of the head can be reduced.

The second connecting part described above can be provided in an outer side portion, in the vehicle width direction, of the upper part of the passenger bag. In addition, the second connecting part can be provided in an inner side portion, in the vehicle width direction, of the upper part of the passenger bag. Furthermore, the second connecting part can be provided in a center portion, in the vehicle width direction, of the upper part of the passenger bag. In this manner, the second connecting part may be provided in any of the vehicle outer side, the vehicle inner side, and center in the vehicle width direction of the passenger bag and, in accordance thereto, a length of the tether belt can be changed as appropriate. By changing the length of the tether belt, a reaction force to be applied to the head of the occupant via the center bag can be set.

The second connecting part described above can be provided more toward a vehicle front side than the first connecting part. In addition, the second connecting part can be provided more toward the vehicle rear side than the first connecting part. Furthermore, the second connecting part can be provided at a same position in the vehicle longitudinal direction as the first connecting part. Any of these configurations is preferable since the center bag is connected to the passenger bag by the tether belt extending between the first connecting part and the second connecting part which makes it difficult for the center bag to move toward the vehicle inner side with respect to the passenger bag.

The passenger bag described above may come into contact with a windshield of the vehicle and with an upper surface of an instrument panel of the vehicle by expanding and deploying. In other words, the passenger bag favorably expands and deploys while being sandwiched between the windshield and the instrument panel. With this configuration, the passenger bag can stabilize its attitude even after being entered by the occupant and, consequently, the attitude of the center bag connected to the passenger bag by the tether belt also becomes more stable.

The second connecting part described above can be provided within a contact area where the passenger bag is in contact with the windshield. Since a movement of the tether belt is suppressed when the second connecting part is sandwiched between the passenger bag and the windshield, the tether belt can support the center bag in a more stable manner.

The passenger bag and the center bag described above may be integrated below the slit. The slit need only be provided at a location which the head of the occupant can come into contact with. By integrating the passenger bag and the center bag below the slit, for example, a chest and the like of the occupant can be suitably restrained.

The center bag described above may have a shape in a vertical direction which is smaller than that of the passenger bag. Since the center bag is provided for the purpose of, for example, restraining the head of the occupant, the center bag may be shaped so as to exist only in an area which may come into contact with the head of the occupant.

The airbag device described above may further include a housing which has a box shape, which houses the passenger bag and the center bag, and which is provided on an inner side of an upper surface of an instrument panel of the vehicle, and the passenger bag and the center bag may expand and deploy by breaching the upper surface of the instrument panel. According to this configuration, a passenger seat airbag device with high occupant restraining performance can be suitably realized.

In addition, in order to solve the problems described above, another representative configuration of the airbag device according to the present invention includes an airbag which expands and deploys due to expansion gas upon an occurrence of a collision of a vehicle. The airbag includes: a main bag area which deploys to the front of an occupant seated on a seat and which restrains a forward movement of the occupant; a sub bag area which is positioned in a side part on at least one side of the main bag area and which is capable of suppressing a rotation of the head of the occupant when deployed; and a tether which joins an upper part of the main bag area and an upper part of the sub bag area with each other. In addition, the tether functions so as to prevent the main bag area and the sub bag area from moving in directions separating from each other when the airbag is deployed.

Moreover, a "side part" of the main bag area is a position deviated in a left-right lateral direction of the vehicle with respect to a line which passes a center of a seat of an occupant to be protected by the airbag and can be described as an outer side of a main portion of the main bag area which protects the occupant during a head-on collision. In addition, the sub bag area may be arranged displaced vertically or longitudinally with respect to the main bag area. Furthermore, the main bag area and the sub bag area need not necessarily be integrally formed.

According to the present invention configured as described above, when an occupant makes a forward movement, the occupant is protected by the main bag area. On the other hand, when the occupant moves obliquely forward, the sub bag area restrains the movement of the occupant and a collision with the center console can be avoided. Furthermore, since a rotation of the neck (head) of the occupant can be effectively suppressed by the sub bag area of which a shape is retained by a tether, neck injuries can be reduced. As described above, an occupant can be restrained in a stable attitude even during a so-called oblique collision and an injury value particularly for the head of the occupant can be suppressed.

In the present invention configured as described above, the sub bag area preferably protrudes more toward a vehicle rearward side than the main bag area. Since the head of the occupant can be protected by an inner-side surface of the protruding sub bag area, a movement of the head of the occupant in a lateral direction can be restrained and, at the same time, a rotation of the head can be suppressed.

By forming the main bag area and the sub bag area described above as a single bag, simplification of structure can be achieved. Moreover, in addition to joining the main bag area and the sub bag area in a fluid and seamless manner, a boundary portion can be distinctly formed so that a groove is formed between both bags.

The sub bag area described above can be formed only in a side part on a vehicle center side of the main bag area. Alternatively, the sub bag area can be constituted by a first chamber and a second chamber respectively formed on left and right sides of the main bag area. By arranging and forming the sub bag area on both sides of the main bag area, even when the vehicle rotates in either direction (clockwise or counterclockwise) during a collision, a movement of the occupant in the lateral direction and a rotation of the head of the occupant can be restrained.

When the sub bag area is arranged on both sides of the main bag area, the main bag area and the first chamber can be joined by a first tether and the main bag area and the second chamber can be joined by a second tether. Furthermore, a third tether can be provided which joins the left and right first and second chambers which constitute the sub bag area with each other. Due to the third tether, the first chamber and the second chamber can be further prevented from spreading toward both left and right sides.

Ends of the first tether, the second tether, and the third tether described above can be fixed by sewing to respectively corresponding bags. Alternatively, the first tether, the second tether, and the third tether can be arranged so as to form a triangle when viewed from above the vehicle during deployment of the airbag and can be configured such that the first tether, the second tether, and the third tether are fixed by sewing in the upper part of the main bag area but are movably supported in the upper parts of the first and second chambers of the sub bag area. According to the configuration described above, regardless of whether a direction in which the head of the occupant comes into contact with the airbag is a left direction or a right direction, a shape of the airbag changes flexibly following the contact and the occupant can be protected.

In the present invention, a "rotation of a vehicle" signifies a rotation within a plane which is horizontal (parallel) with respect to the ground on which the vehicle travels or, in other words, a rotation component around a rotational axis which is perpendicular to the ground. In addition, a "rotation of a vehicle" also includes a case where a movement or a rotation other than the rotation within the horizontal plane occurs simultaneously. For example, a "rotation of a vehicle" also includes a case of a rotation with a direction of travel as an axis thereof such as a rollover while rotating horizontally.

According to the present invention, an airbag device can be provided which is capable of restraining an occupant in a stable attitude even during an oblique collision and which is capable of suppressing an injury value particularly for the head of the occupant. In addition, an airbag device can be provided which is capable of effectively restraining, with a simple structure, an obliquely forward movement of an occupant and particularly a rotation of the head.

BRIEF DESCRIPTION OF THE DRAWINGS

FIG. 16 is a plan view showing a schematic configuration of a vehicle mounted with an airbag device according to the present invention.

FIG. 18 is a side view showing an airbag deployed state body in the airbag device according to the first embodiment.

DETAILED DESCRIPTION

Figure 1:
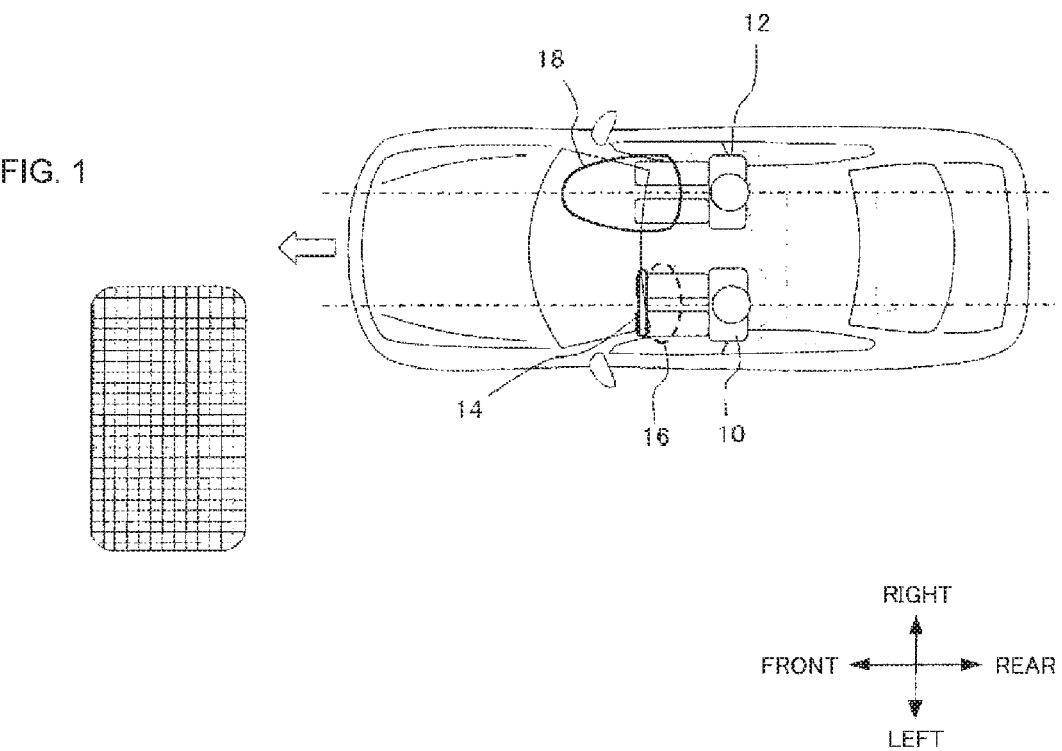
FIG. 1 is a plan view which shows a structure of a conventional vehicle in accordance with the prior art mounted with airbag devices for a driver's seat and a passenger seat and which shows a situation where the vehicle is approaching, at an angle of 0 degrees, an object (an obstacle) at a position deviated from directly in front.
Figure 2:
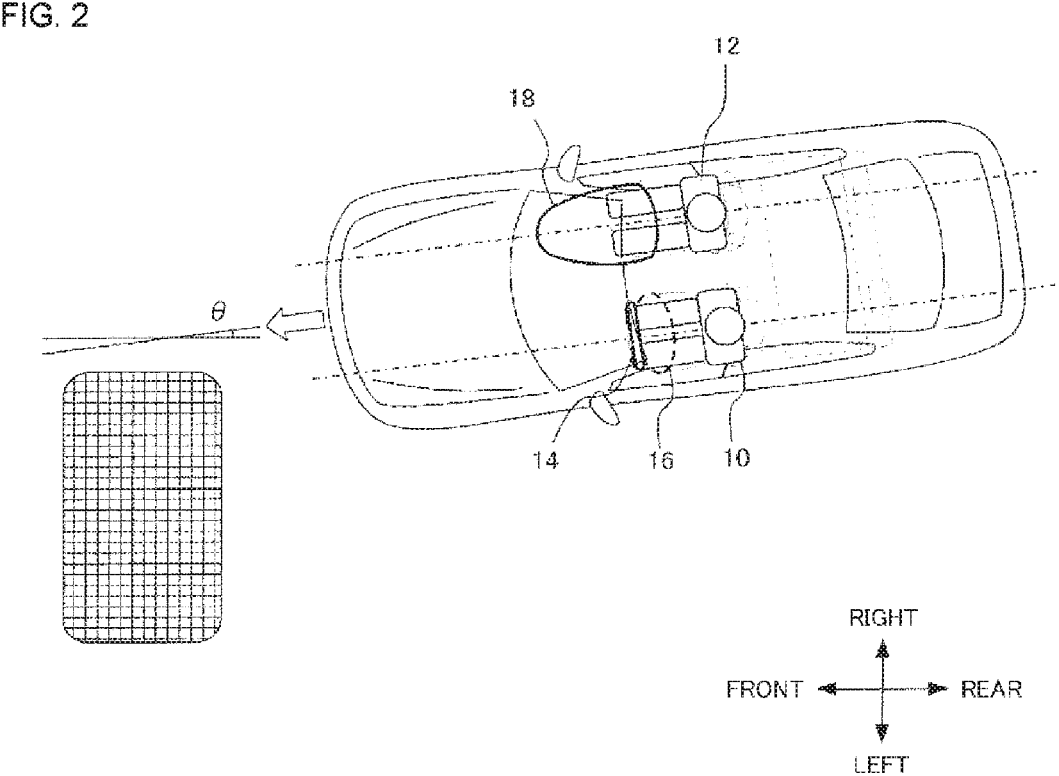
FIG. 2 is a plan view which shows a structure of a conventional vehicle in accordance with the prior art mounted with airbag devices for a driver's seat and a passenger seat and which shows a situation where the vehicle is approaching, at a prescribed angle θ, an object (an obstacle) at a position deviated from directly in front.
Figure 3:
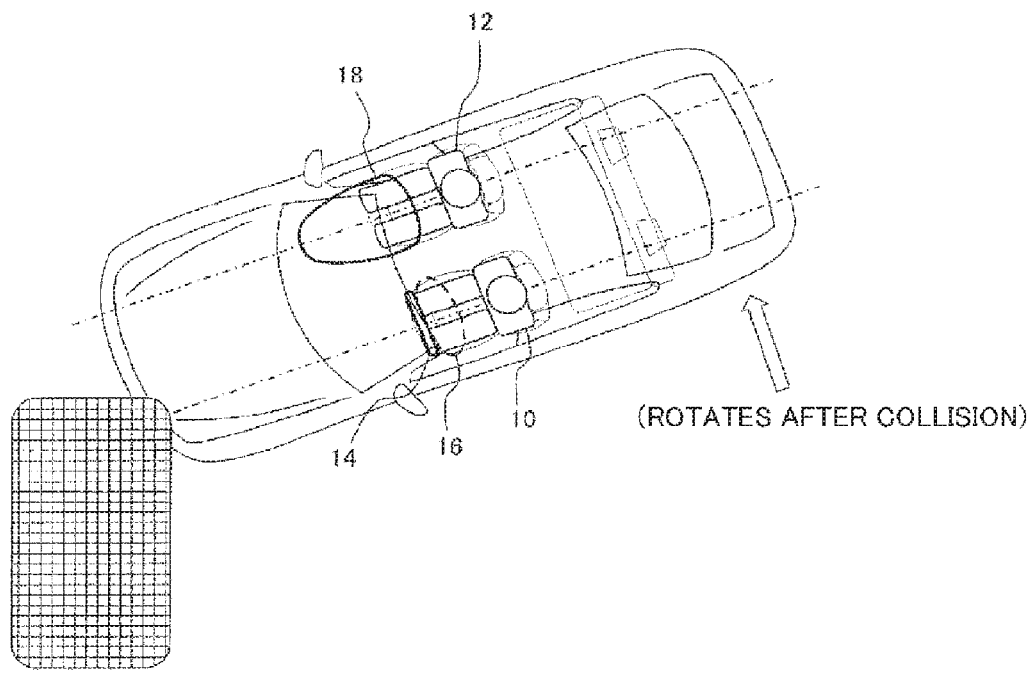
FIG. 3 is a plan view which shows a structure of a conventional vehicle in accordance with the prior art mounted with airbag devices for a driver's seat and a passenger seat and which shows a situation where the vehicle approaches, at a prescribed angle θ, an object (an obstacle) at a position deviated from directly in front and a vehicle body subsequently rotates.
Figure 3:
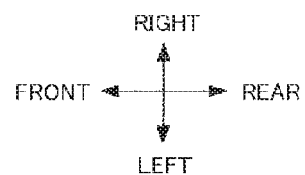

Hereinafter, preferred embodiments of the present invention will be described in detail with reference to the accompanying drawings. Dimensions, materials, specific numerical values, and the like described in the embodiments are simply examples provided in order to facilitate understanding of the present invention and are not intended to limit the invention unless otherwise noted. Moreover, for elements having functions or configurations which are substantially the same in the present specification and in the drawings, redundant descriptions will be omitted by denoting such elements with same reference signs. In addition, elements not directly related to the present invention will not be illustrated.

Figure 4A:
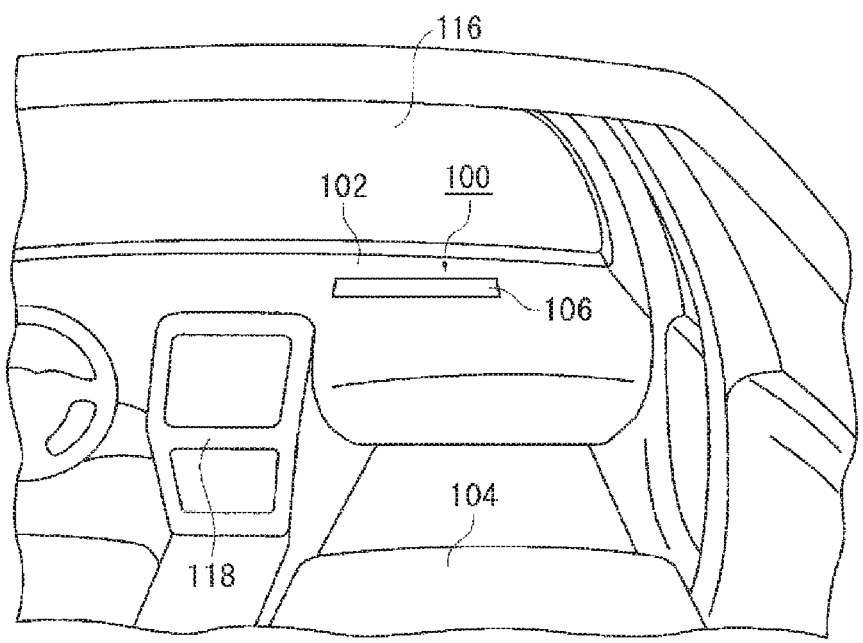
FIGS. 4(a) and (b) are diagrams illustrating an outline of an airbag device according to a first embodiment of the present invention.

FIG. 4 is a diagram illustrating an outline of an airbag device 100 according to a first embodiment of the present invention. FIG. 4(a) is a diagram illustrating a vehicle before operation of the airbag device 100. In the present embodiment, the airbag device 100 is embodied as an airbag device for a passenger seat. The airbag device 100 is installed on an inner side of an upper surface 106 on a side of a passenger seat 104 of an instrument panel 102.

Figure 4B:
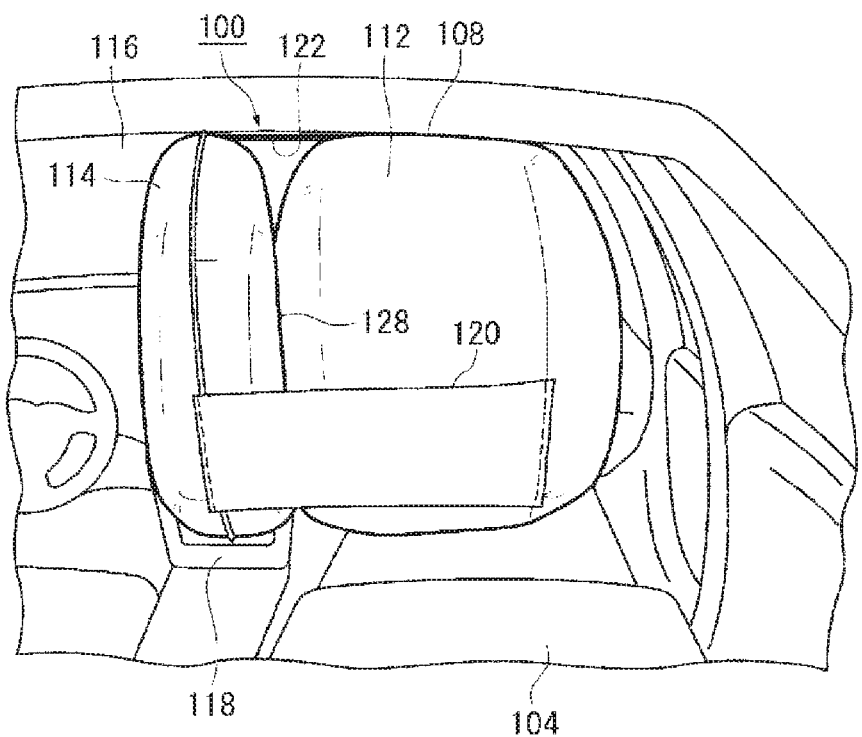

When the airbag device 100 receives a detection signal of an impact from a sensor (not shown), a cushion 108 (refer to FIG. 4(b)) cleaves the upper surface 106 and expands and deploys toward the rear of the vehicle. FIG. 4(b) is a diagram illustrating a vehicle after operation of the airbag device 100. The cushion 108 of the airbag device 100 restrains an occupant 132 (refer to FIG. 6(a)) of the passenger seat 104 from the front of the vehicle. The cushion 108 has a bag shape and expands and deploys as gas is supplied from an inflator 110 (refer to FIG. 6(a)). The cushion 108 is formed by, for example, laying a plurality of sheets of base fabric constituting a surface thereof one on top of another and sewing, bonding, or spinning and weaving the plurality of sheets of base fabric using OPW (One-Piece Woven).

The cushion 108 of the airbag device 100 includes two parts, namely, a passenger bag 112 and a center bag 114. The passenger bag 112 is a part with a large capacity which expands and deploys toward a front side of the passenger seat 104. The passenger bag 112 expands and deploys so as to fill a space between the occupant 132 of the passenger seat 104, the instrument panel 102, and a windshield 116. Accordingly, the occupant 132 is prevented from colliding with the instrument panel 102. In addition, by preventing the occupant 132 from colliding with the windshield 116, the occupant 132 is also restrained from being thrown outside of the vehicle.

The center bag 114 is a flat part with a smaller capacity than the passenger bag 112 which expands and deploys on a vehicle inner side of the passenger bag 112. The center bag 114 expands and deploys to the front of a center console 118 as viewed from the occupant 132 (refer to FIG. 6(a)) and prevents the occupant 132 from moving toward the vehicle inner side or from colliding with the center console 118 during an oblique collision and the like. Lower parts of the passenger bag 112 and the center bag 114 are connected to each other and integrated by a cloth-like tie panel 120.

Figure 5A:
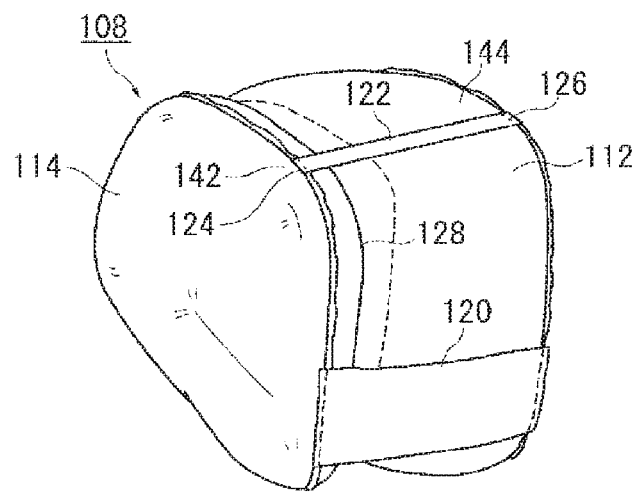
FIGS. 5(a), (b) and (c) are diagrams illustrating a cushion during expansion and deployment shown in FIG. 4(b) from respective directions.

FIGS. 5 (a), (b) and (c) are diagrams illustrating the cushion 108 during expansion and deployment shown in FIG. 4(b) from respective directions. FIG. 5(a) is a perspective view illustrating the cushion 108 shown in FIG. 4(b) as viewed from above on the vehicle inner side. As illustrated in FIG. 5(a), an upper part 142 of the center bag 114 is connected to an upper part 144 of the passenger bag 112 by a tether belt 122. The tether belt 122 has a band shape and assumes a role of supporting an attitude of the center bag 114. The tether belt 122 is formed of, for example, a same type of base fabric as the cushion 108 and is respectively connected by sewing to a first connecting part 124 on the center bag 114 and a second connecting part 126 on the passenger bag 112.

Figure 5B:
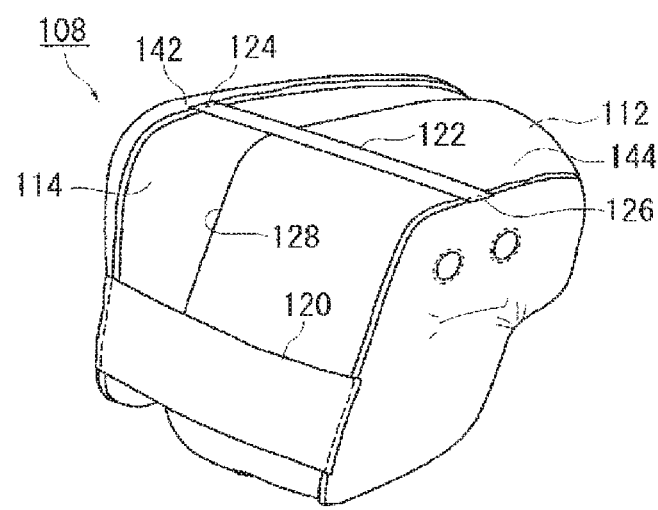

FIG. 5(b) is a perspective view illustrating the cushion 108 shown in FIG. 5(a) as viewed from above on a vehicle outer side. A slit 128 is formed between the center bag 114 and the passenger bag 112. The slit 128 separates the center bag 114 and the passenger bag 112 from each other on a vehicle rearward side. The slit 128 is a part which particularly restrains the head E1 of the occupant 132 (refer to FIG. 6(a)) to be described later. The tether belt 122 and the tie panel 120 are arranged so as to avoid positions where the head E1 of the occupant 132 may come into contact with, and expose the slit 128.

Two vent holes 130 are provided on the vehicle outer side of the passenger bag 112. The vent holes 130 are so-called exhaust holes which discharge gas supplied from an inflator 110 (refer to FIG. 6(a)) to the outside. Since only a side window and the like exist and the occupant 132 (refer to FIG. 6(a)) is not present on the vehicle outer side of the passenger bag 112, providing the vent holes 130 on the vehicle outer side of the passenger bag 112 is effective in this regard.

Figure 5C:
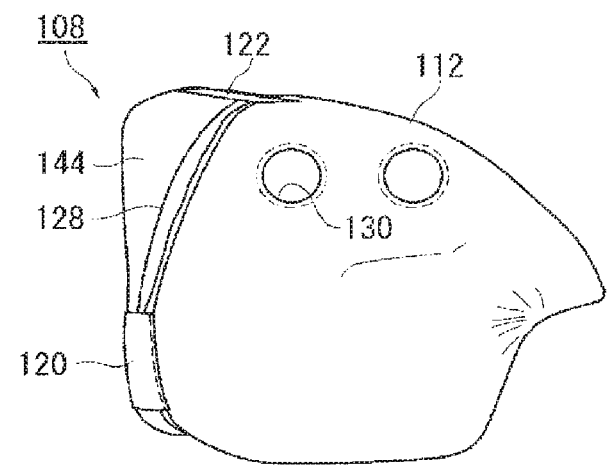

FIG. 5(c) is a diagram illustrating the cushion 108 shown in FIG. 5(b) as viewed from the vehicle outer side. As illustrated in FIG. 5(c), the center bag 114 according to the present embodiment expands and deploys so as to protrude more toward the rear of the vehicle (leftward in FIG. 5(c))

than the passenger bag 112. The center bag 114 is set so as to particularly restrain the side of the head E1a of the occupant 132 (refer to FIG. 6(a)). The center bag 114 is supported against the passenger bag 112 by the tether belt 122 and is capable of functioning as a reaction force surface which restrains the side of the head E1a.

Figure 6A:
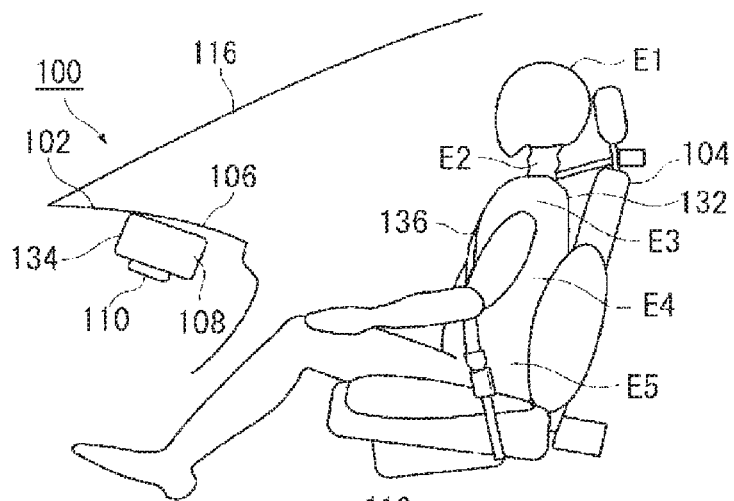
FIGS. 6(a), (b) and (c) are diagrams illustrating a process of a cushion shown in FIG. 5(c) restraining an occupant.

FIGS. 6(a), (b) and (c) are diagrams illustrating a process of the cushion 108 shown in FIG. 5(c) restraining the occupant 132. In the respective drawings in FIG. 6, a left side represents the front of the vehicle. FIG. 6(a) is a diagram illustrating an undeployed state of the cushion 108. As illustrated in FIG. 6(a), the passenger bag 112 and the center bag 114 constituting the cushion 108 are both housed in a housing 134. The housing 134 has, for example, a box shape with an opened upper part and houses the folded cushion 108.

The inflator 110 is installed on a bottom surface of the housing 134. For example, while a disk-type inflator with a disk shape can be used as the inflator 110, a cylinder-type inflator with a cylindrical shape may be used instead. In addition, currently widely used inflators include those which are filled by a gas generating agent and which burn the gas generating agent to generate gas, those which are filled with compressed gas and which supply gas without generating heat, and hybrid types which use both combustion gas and compressed gas. Any of these types may be used as the inflator.

Figure 6B:
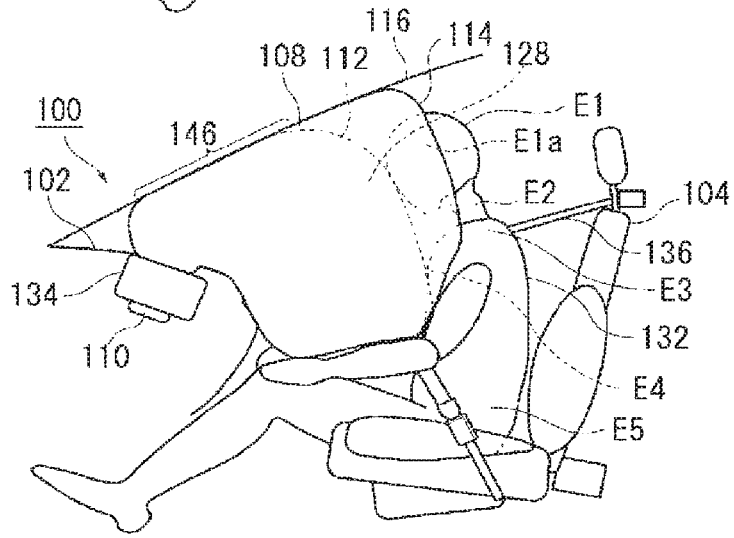

When the airbag device 100 receives a detection signal of an impact from a sensor (not shown), the cushion 108 receives gas from the inflator 110 and starts to expand. FIG. 6(b) is a diagram illustrating the expanded and deployed cushion 108. The cushion 108 breaches from the upper surface 106 of the instrument panel 102 which assumes the role of a lid of the housing 134, and expands and deploys toward the rear of the vehicle. In the cushion 108, the passenger bag 112 and the center bag 114 are connected to each other by, for example, an internal vent hole (not shown) and expand and deploy using the common inflator 110. However, the internal vent hole is not essential and a configuration may be adopted in which the passenger bag 112 and the center bag 114 are mutually independent bags which use separate inflators.

The occupant 132 illustrated in FIG. 6(b) has approached closer to the side of the cushion 108 than the occupant 132 in FIG. 6(a). During an emergency such as a vehicle collision, the occupant 132 moves toward the front of the vehicle by inertia. When the occupant 132 is wearing a seat belt 136, the occupant 132 moves along a trajectory representing forward bending of the upper body around the hip E5. In particular, during an oblique collision, the occupant 132 may move obliquely forward on the vehicle inner side, and the upper body of the occupant 132 may bend forward so as to rotate with the left shoulder E3 toward the front.

The passenger bag 112 mainly restrains the head E1, the shoulder E3, the chest E4, and the like of the occupant 132. The expanded and deployed passenger bag 112 comes into contact with the windshield 116 and the upper surface 106 of the instrument panel 102. By expanding and deploying while being sandwiched between the windshield 116 and the instrument panel 102, the passenger bag 112 can restrain the occupant 132 in a stable attitude even when the occupant 132 compresses the passenger bag 112.

Figure 6C:
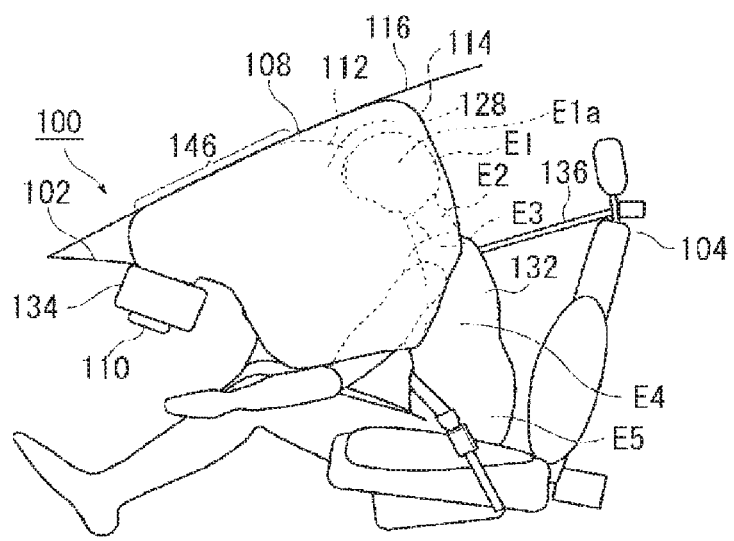

The center bag 114 protrudes more toward the rear of the vehicle than the passenger bag 112. As illustrated in FIG. 6(b), the occupant 132 who moves obliquely forward on the vehicle inner side during an oblique collision comes into contact with the center bag 114 from the side of the head E1a. FIG. 6(c) is a diagram illustrating a state where the occupant 132 shown in FIG. 6(b) has further approached toward the side of the cushion 108. As illustrated in FIG. 6(c), the head E1 of the occupant 132 is guided into the slit 128 while bringing the side of the head E1a into contact with the center bag 114 and is restrained by the slit 128.

Figure 7A:
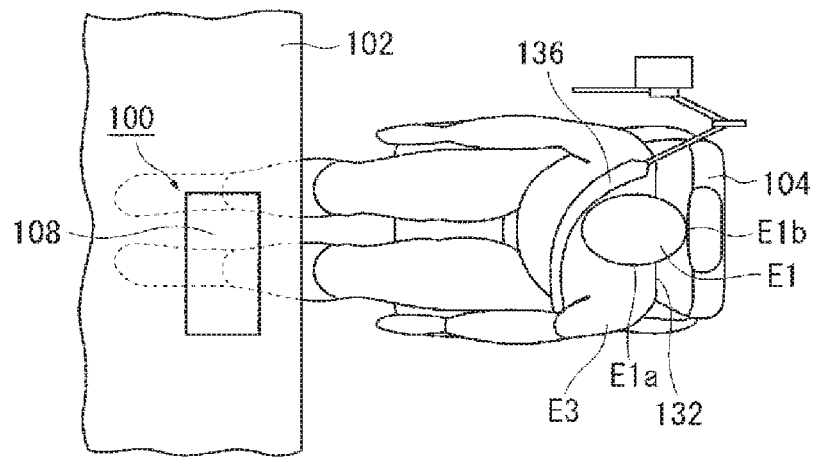
FIGS. 7(a), (b) and (c) are diagrams illustrating a process of a cushion shown in FIG. 6 restraining an occupant as viewed from above.
Figure 7B:
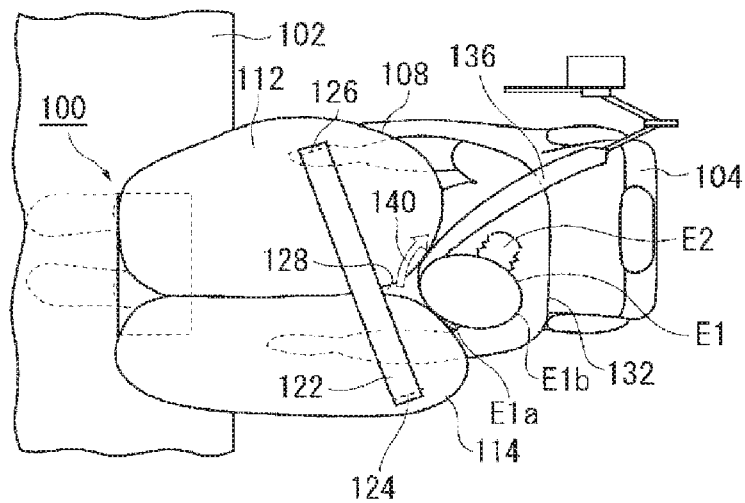
Figure 7C:
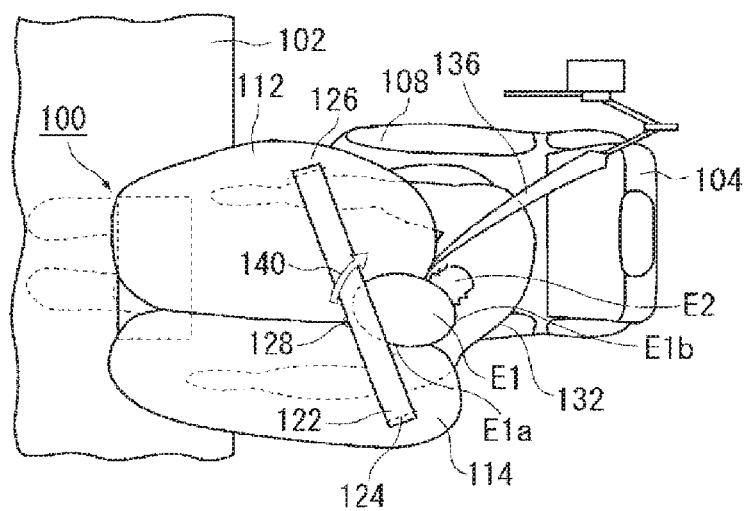

FIGS. 7(a), (b) and (c) are diagrams illustrating a process of the cushion 108 shown in FIG. 6 restraining the occupant 132 as viewed from above. FIG. 7(a) to FIG. 7(c) respectively correspond to FIG. 6(a) to FIG. 6(c). Hereinafter, a process by which the cushion 108 restrains the occupant 132 will be described with reference to FIG. 7(a) to FIG. 7(c).

As illustrated in FIG. 7(a), let us assume that the occupant 132 of the passenger seat 104 is seated while wearing the seat belt 136. In this case, when an impact occurs on the vehicle, an operation signal is transmitted to the airbag device 100 from a sensor (not shown) and the cushion 108 expands and deploys as shown in FIG. 7(b). During an oblique collision, the occupant 132 moves obliquely forward on the vehicle inner side. In the present embodiment, the center bag 114 protrudes more toward the vehicle rear side than the passenger bag 112, and the head E1 of the occupant 132 comes into contact with the center bag 114 from the side of the head E1a.

FIG. 7(c) is a diagram showing the occupant 132 in FIG. 7(b) having further approached toward the side of the cushion 108. When the head E1 of the occupant 132 moving obliquely forward comes into contact with the passenger bag 112 existing in front of the passenger seat 104, a clockwise rotational force (a rotation 140 depicted by an arrow) may be generated on the head E1 with the neck E2 as an axis when viewed from above. In consideration thereof, in the present embodiment, the center bag 114 which protrudes more toward the rear of the vehicle than the passenger bag 112 is provided on the vehicle inner side of the passenger bag 112, and the slit 128 is provided between the passenger bag 112 and the center bag 114.

According to this configuration, the head E1 of the occupant 132 which moves obliquely forward on the vehicle inner side is restrained so as to enter the slit 128 while bringing the side of the head E1a into contact with the center bag 114. In particular, in the present embodiment, since the center bag 114 actively restrains a range from the side of the head E1a to the back of the head E1b, the rotation 140 generated on the head E1 can be reduced or canceled. With this configuration, an angular velocity of the rotation 140 of the head E1 of the occupant 132 can be reduced and an injury value of the head E1 as a result of the rotation 140 can be suppressed.

The center bag 114 is connected to the passenger bag 112 by the tether belt 122 and, accordingly, the center bag 114 is capable of reliably restraining the head E1 of the occupant 132. The first connecting part 124 of the tether belt 122 is provided in the upper part 142 of the center bag 114 on the vehicle rear side. In addition, the second connecting part 126 of the tether belt 122 is provided on the vehicle outer side of the upper part 144 of the passenger bag 112. The tether belt 122 is tensioned when the passenger bag 112 and the center bag 114 expand and deploy and the first connecting part 124 and the second connecting part 126 move in directions separating from each other. Due to the tensioned tether belt 122, even if the heavy head E1 of the occupant 132 comes into contact with the center bag 114 from the vehicle outer side, the center bag 114 can restrain the head E1 without becoming too separated from the passenger bag 112.

Figure 8A:
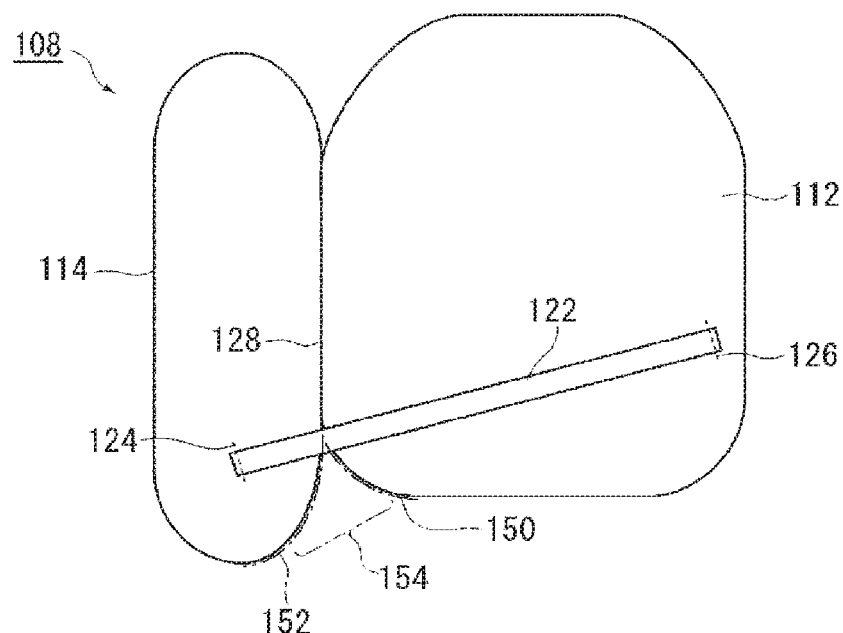
FIGS. 8(a) and (b) are diagrams illustrating a cushion shown in FIG. 7(c) from respective directions.

The configuration of the cushion 108 will be further described. FIGS. 8(a) and (b) are diagrams illustrating the cushion 108 shown in FIG. 7(c) from respective directions. FIG. 8(a) is an enlarged view of the cushion 108 shown in FIG. 7(c). The second connecting part 126 of the tether belt 122 according to the present embodiment is provided more toward the front of the vehicle than the first connecting part 124. Therefore, the center bag 114 enters a state of being pulled forward on the vehicle outer side by the tether belt 122 and can efficiently restrain the head E1 in a more stable attitude.

In the present embodiment, the passenger bag 112 and the center bag 114 come into contact with each other in the vehicle width direction and the slit 128 is closed. When the cushion 108 is viewed from above, a curved surface 150 is formed at a rear end and on a side of the slit 128 of the passenger bag 112, and a curved surface 152 is formed at a rear end and on a side of the slit 128 of the center bag 114. Due to the curved surface 150 and the curved surface 152, a valley 154 is formed on a rear side of the slit 28 or, in other words, at an entrance of the slit 128. The valley 154 becomes narrower toward a front side of the slit 128 as viewed from above. Due to the formation of the valley 154 at the entrance of the slit 128, the head E1 of the occupant 132 (refer to FIG. 7(b)) is guided toward the slit 128 particularly along the curved surface 152. In this manner, the valley 154 functions effectively when restraining the head E1 of the occupant 132 so that the head E1 approaches the slit 128.

Figure 8B:
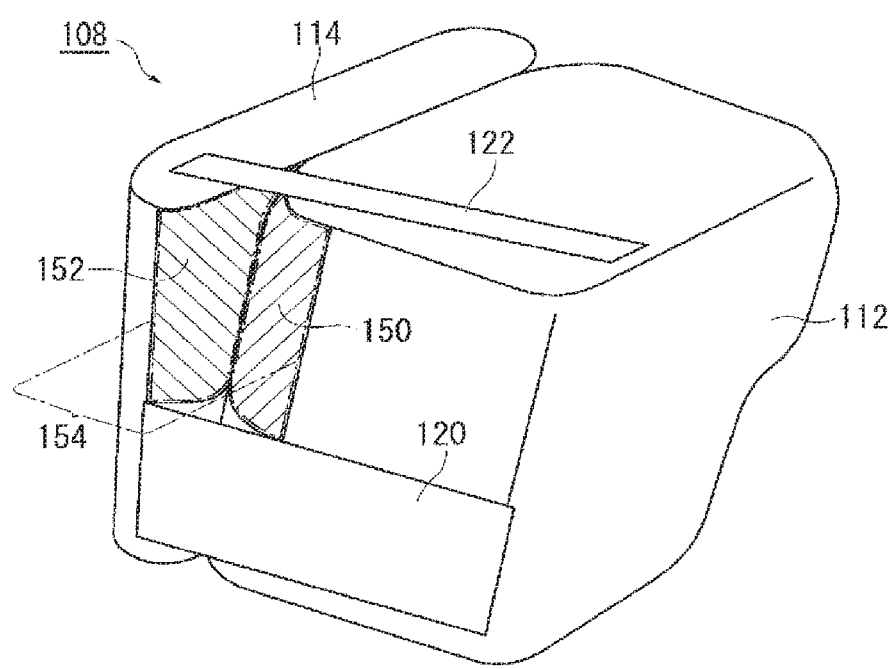

FIG. 8(b) is a schematic view of the cushion 108 shown in FIG. 8(a) as viewed from above on the vehicle outer side. As illustrated in FIG. 8(b), at the entrance of the slit 128, the curved surface 150 is provided on the passenger bag 112 and the curved surface 152 is provided on the center bag 114 to form the valley 154. According to this configuration, regardless of whether the head E1 of the occupant 132 (refer to FIG. 7(b)) first comes into contact with the center bag 114 or first comes into contact with the passenger bag 112, the head E1 can be effectively guided by the curved surfaces 152 and 150 into the slit 128 to be restrained.

With reference to FIG. 7(b) described above, it has been described that the contact between the occupant 132 and the cushion 108 starts when the side of the head E1a comes into contact with the center bag 114. However, the contact between the occupant 132 and the cushion 108 may be performed in various ways such as the head E1 simultaneously coming into contact with the center bag 114 and the passenger bag 112 or the head E1 first coming into contact with the passenger bag 112. In addition, there may be cases where the head E1 comes into contact with the passenger bag 112 or the like after the shoulder E3 (refer to FIG. 6(b) and the like) or the chest E4 comes into contact with the passenger bag 112 or the like. Nevertheless, in any case, according to the configuration of the present embodiment described with reference to FIG. 8(b), the head E1 of the occupant 132 can be guided into the slit 128 to be restrained in an effective manner.

FIG. 7(b) illustrates the clockwise rotation 140 as an example of a rotation generated on the head E1. However, there may be cases where a counterclockwise rotation centered on the neck as viewed from above is generated on the head E1. Even with respect to such a counterclockwise rotation, the cushion 108 according to the present embodiment can use the slit 128 to reduce or cancel the counterclockwise rotation and reduce an angular velocity of the head E1. In other words, the airbag device 100 according to the present embodiment produces similar effects with respect to both clockwise and counterclockwise rotations which are generated on the head E1.

Figure 9A:
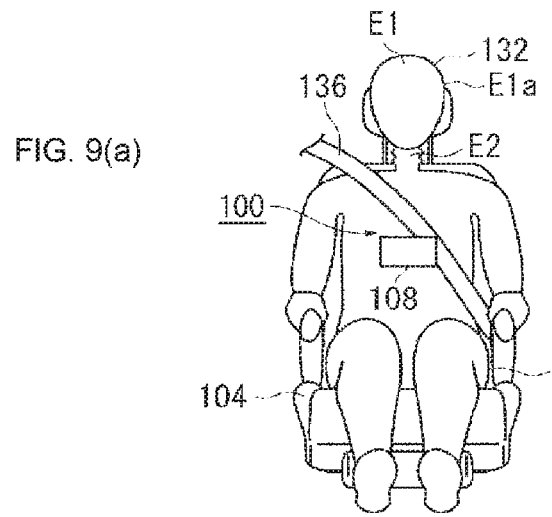
FIGS. 9(a), (b) and (c) are diagrams illustrating a process of a cushion shown in FIGS. 7(a), (b) and (c) restraining an occupant as viewed from the front of a vehicle.

The process by which the cushion 108 restrains the occupant 132 will also be described from a different angle. FIGS. 9(a), (b) and (c) are diagrams illustrating the process of the cushion 108 shown in FIG. 7 restraining the occupant 132 as viewed from the front of the vehicle. As illustrated in FIG. 9(a), let us assume that the occupant 132 of the passenger seat 104 is seated while wearing the seat belt 136. When an impact occurs on the vehicle in this case, the passenger bag 112 expands and deploys to the front of the occupant 132 as shown in FIG. 9(b) and the center bag 114 expands and deploys forward on the vehicle inner side (a right side in FIG. 9(b)) of the occupant 132.

Figure 9B:
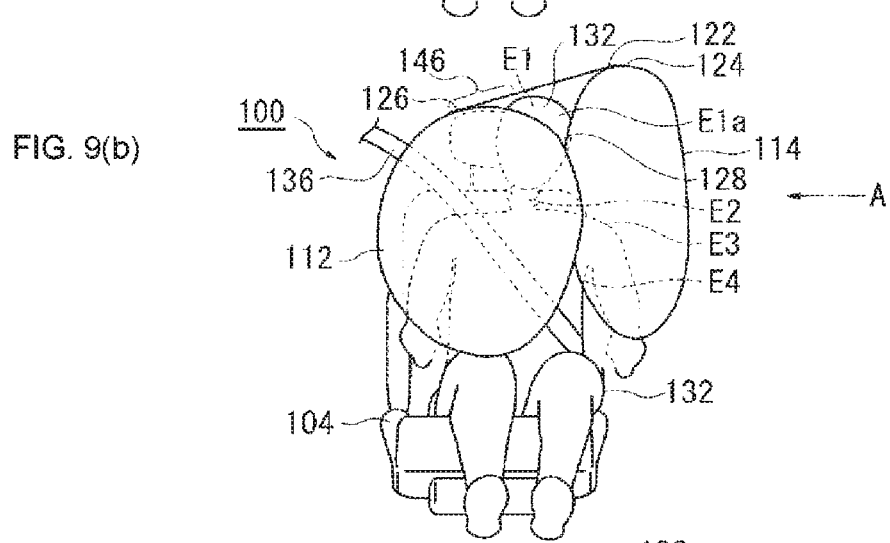

As illustrated in FIG. 9(b), the occupant 132 having moved obliquely forward on the vehicle inner side from a seated position brings the side of the head E1a into contact with the center bag 114. Subsequently, as illustrated in FIG. 9(c), the head E1 is guided by the center bag 114 to enter the slit 128 towards the front of the vehicle and is restrained by the slit 128.

The second connecting part 126 of the tether belt 122 which supports the center bag 114 is provided in a contact area 146 where the passenger bag 112 is in contact with the windshield 116. Since a movement of the tether belt 122 is suppressed when the second connecting part 126 is sandwiched between the passenger bag 112 and the windshield 116, the tether belt 122 can support the center bag 114 in a more stable manner. In addition, since the passenger bag 112 is tensioned so as to be sandwiched between the instrument panel 102 and the windshield 116, the passenger bag 112 has a stable attitude. Since the center bag 114 is supported by the passenger bag 112 via the tether belt 122, separation of the center bag 114 from the passenger bag 112 is suppressed.

Figure 9C:
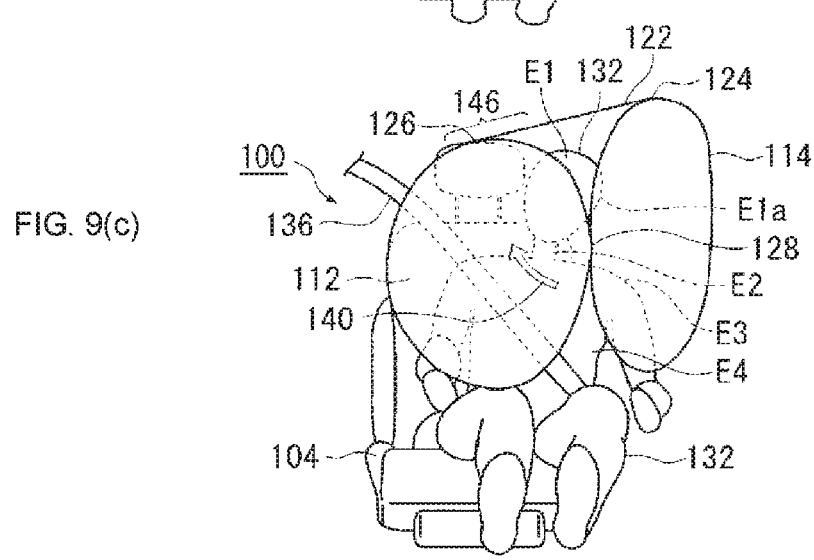
Figure 10:
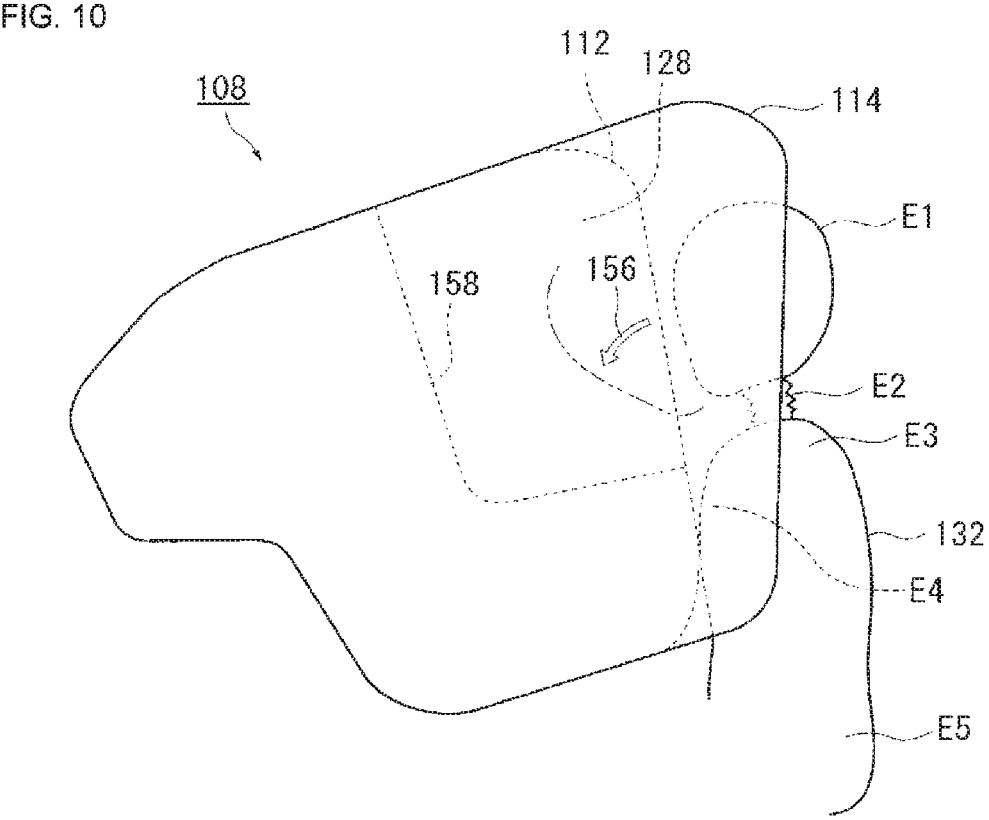
FIG. 10 is a schematic diagram of a cushion shown in FIG. 9(c) in a view of an arrow A.

FIG. 10 is a schematic diagram of the cushion 108 shown in FIG. 9(c) in a view of an arrow A. As illustrated in FIG. 10, during an occurrence of a collision to the vehicle, the upper body of the occupant 132 mainly moves so as to rotate toward the front of the vehicle around the hip E5. At this point, in addition to moving toward the front of the vehicle from a seated position, the head E1 of the occupant 132 traces a trajectory 156 which dips downward. In view of the trajectory 156 of the head E1, the present embodiment takes a depth of the slit 128 into consideration.

FIG. 10 illustrates a connecting portion 158 between the center bag 114 and the passenger bag 112. The connecting portion 158 doubles as a portion constituting a bottom of the slit 128 and determines a depth of the slit 128. The connecting portion 158 is provided by sewing, by having the center bag 114 and the passenger bag 112 geometrically connected to each other, or the like. In the present embodiment, the slit 128 is set so that the head E1 of the occupant 132 does not come into contact with the connecting portion 158. The connecting portion 158 is provided such that, for example, when the shoulder E3 of the occupant 132 is restrained by the center bag 114 or the passenger bag 112, the connecting portion 158 avoids the trajectory 156 of the head E1 which is created as a result of the shoulder E3 being restrained. According to this configuration, the head E1 can be prevented from coming into contact with the connecting portion 158 and the cushion 108 which gives greater consideration to safety can be realized.

According to the configuration described above, the center bag 114 is capable of suitably restraining the head E1 and, particularly, the side of the head E1a of the occupant 132. In particular, the center bag 114 restrains a range from the side of the head E1a to the back of the head E1b of the occupant 132 which also includes a slightly rearward side of a center of gravity of the head E1. In addition, the restraint of the head E1 is completed by the slit 128 between the passenger bag 112 and the center bag 114. According to these configurations, with the airbag device 100 according to the present embodiment that is capable of suppressing the rotation 140 which may occur on the head E1 of the occupant 132, the rotation 140 of the head E1 can be suppressed and an injury value can be significantly reduced.

Figure 11A:
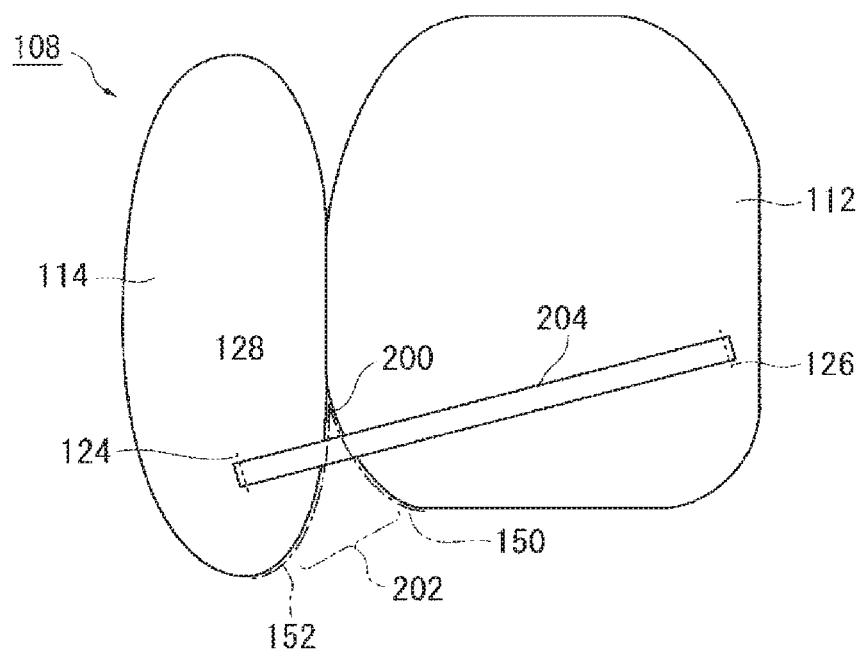
FIGS. 11(a) and (b) are diagrams illustrating a modification of a slit shown in FIG. 8(a).
Figure 11B:
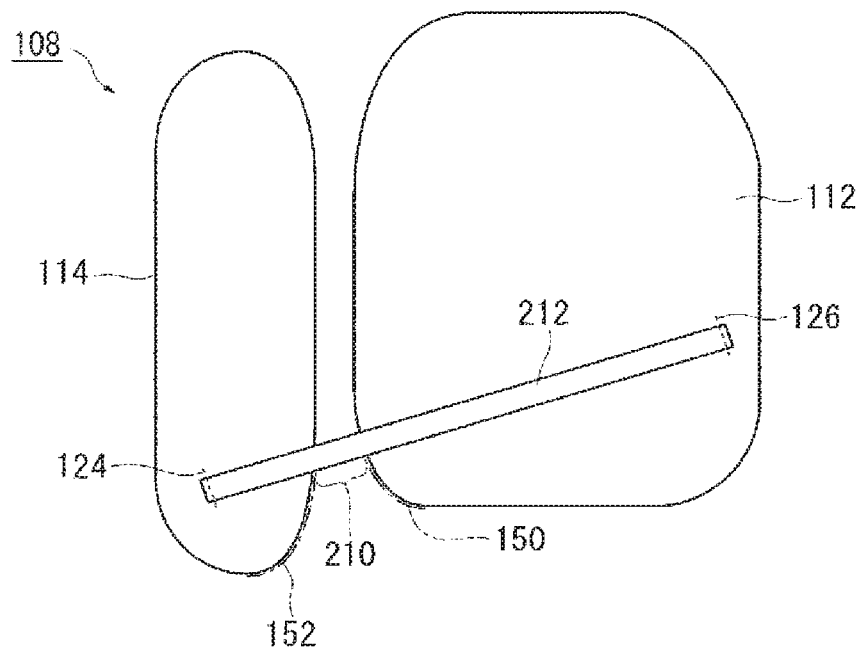

FIGS. 11(*a*) and (*b*) are diagrams for illustrating a modification of the slit 128 shown in FIG. 8(*a*). Moreover, in the present specification below, a description of a component sharing a same configuration and a same function as an already-described component will be omitted by denoting the component using a same reference sign. In addition, a component with a different reference sign but a same name as an already-described component will be considered to have a same function unless otherwise noted.

FIG. 11(*a*) is a diagram illustrating a slit 200 which represents a first modification. In FIG. 8(*a*), the center bag 114 and the passenger bag 112 come into contact with each other with a certain amount of pressure to form the closed slit 128. On the other hand, with the slit 200 shown in FIG. 11(*a*), since opposing pressure of the center bag 114 and the passenger bag 112 is suppressed, the center bag 114 and the passenger bag 112 are slightly separated from each other and a contact area is reduced. A positional relationship between the center bag 114 and the passenger bag 112 can be set by extending the tether belt 204 or the like. With the slit 200, in particular, a valley 202 is formed deeper toward the front of the vehicle than the valley 154 shown in FIG. 8(*a*). In this manner, by setting the positional relationship between the center bag 114 and the passenger bag 112, a contact area between the center bag 114 and the passenger bag 112 can be increased or reduced and a configuration of the slit can be appropriately set.

FIG. 11(*b*) is a diagram illustrating a slit 210 which represents a second modification. By extending a tether belt 212 so that the center bag 114 and the passenger bag 112 are entirely separated from each other, the slit 210 is formed as a gap having a certain width. Even with this slit 210, the head E1 of the occupant 132 (refer to FIG. 7(*c*) and the like) can be restrained in a similar manner to the slit 128 shown in FIG. 8(*a*).

As in the cases of the slit 200 shown in FIG. 11(*a*) and the slit 210 shown in FIG. 11(*b*), the slit included in the airbag device 100 according to the present invention refers to a portion between the center bag 114 and the passenger bag 112 and includes both a case where the slit is configured as a closed gap and a case where the slit is configured as a narrow space. Regardless of the configuration of the slit, the head E1 of the occupant 132 (refer to FIG. 7(*c*) and the like) can be restrained and a rotation can be canceled or an angular velocity thereof can be reduced.

FIGS. 12(*a*) and (*b*) are diagrams illustrating a modification of the center bag 114 shown in FIG. 8(*a*). With a center bag 220 according to a first modification which is illustrated in FIG. 12(*a*), a rear end 222 thereof is positioned more toward the vehicle front side than a rear end 224 of the passenger bag 112. In other words, the passenger bag 112 is provided such that the rear end 224 thereof protrudes more toward the vehicle rear side than the rear end 222 of the center bag 220. Even with this configuration, when the occupant 132 moves toward the vehicle inner side along the passenger bag 112, the head E1 of the occupant 132 (refer to FIG. 7(*b*) and the like) is restrained so as to enter the slit 128. As described above, even with a configuration including the center bag 220, a rotation of the head E1 of the occupant 132 can be canceled and an angular velocity which may occur on the head E1 can be reduced.

FIG. 12(*b*) illustrates a center bag 230 according to a second modification. With the center bag 230, a rear end 232 thereof is provided at a same position as the rear end 224 of the passenger bag 112 in the vehicle longitudinal direction. Even with this configuration, when the occupant 132 (refer to FIG. 7(*b*) and the like) moves toward the vehicle inner side along the passenger bag 112, the head E1 of the occupant 132 is restrained so as to enter the slit 128. Therefore, a rotation of the head E1 of the occupant 132 can be canceled or an angular velocity thereof can be reduced.

Figure 13A:
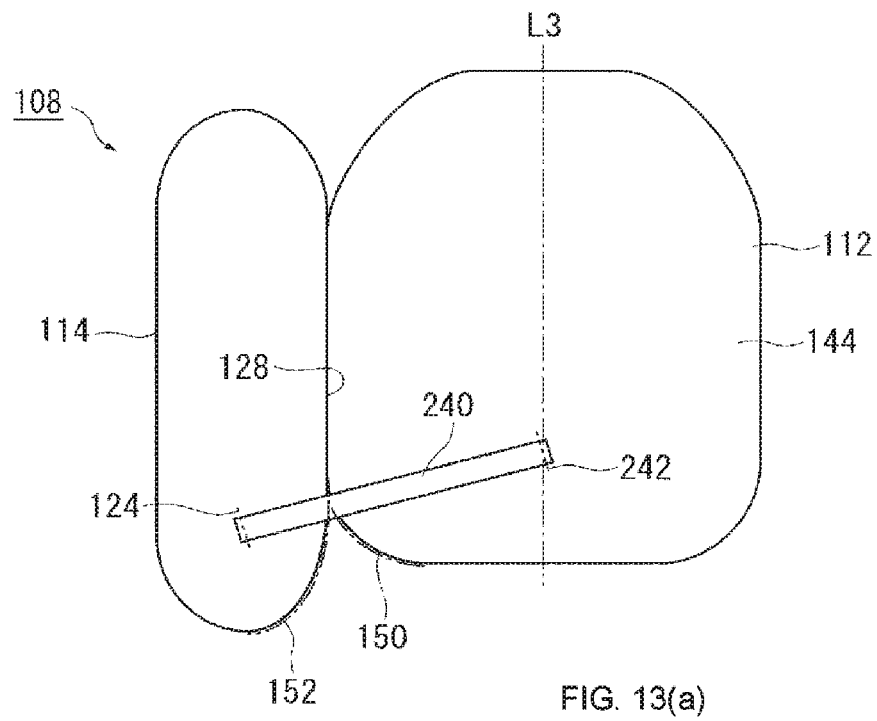
FIGS. 13(a) and (b) are diagrams illustrating respective modifications of a tether belt shown in FIG. 8(a).
Figure 13B:
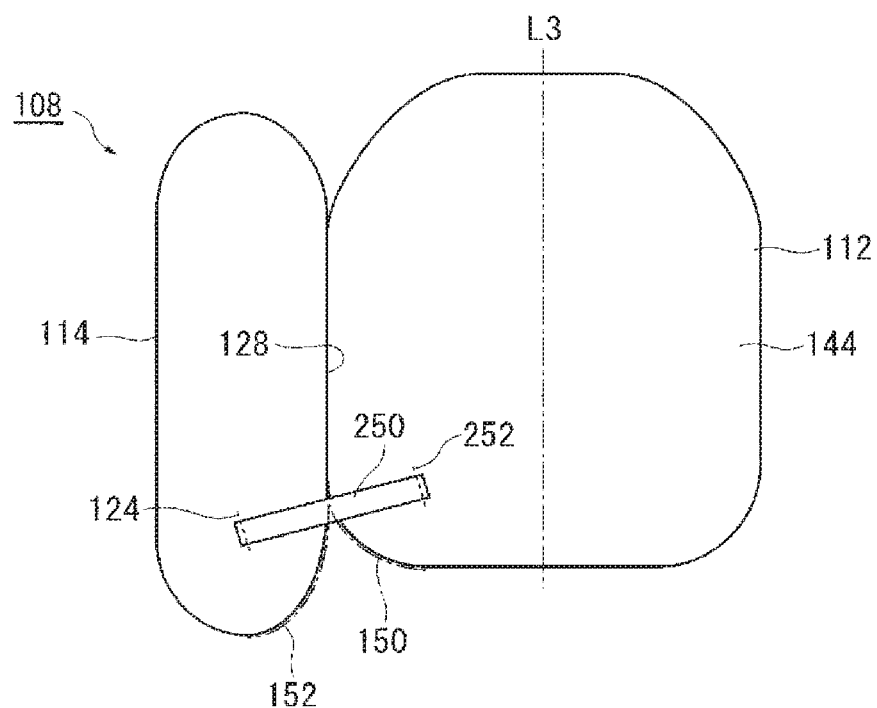

(FIGS. 13(*a*) and (*b*) are diagrams illustrating respective modifications of the tether belt 122 shown in FIG. 8(*a*). FIG. 13(*a*) illustrates a tether belt 240 which represents a first modification. With the tether belt 240, a second connecting part 242 on the passenger bag 112 is provided in a central portion, in the vehicle width direction, of the upper part 114 of the passenger bag 112 denoted by a center line L3. According to this configuration, the tether belt 240 is made shorter than the tether belt 122 shown in FIG. 8(*a*).

FIG. 13(*b*) illustrates a tether belt 250 which represents a second modification. With the tether belt 250, a second connecting part 252 is provided in an inner side portion, in the vehicle width direction, of the upper part 144 of the passenger bag 112. According to this configuration, the tether belt 202 is made even shorter than the tether belt 240 shown in FIG. 12(*a*).

In this manner, with the tether belt included in the airbag device 100 according to the present invention, the second connecting part to be connected to the passenger bag 112 may be appropriately provided in any of the vehicle outer side, the center portion, and the vehicle inner side of the passenger bag 112 and, in accordance thereto, a length of the tether belt can be changed as appropriate. By changing the length of the tether belt, the airbag device 100 can appropriately set a reaction force to be applied to the head E1 of the occupant 132 via the center bag 114.

A direction in which the tether belt extends will also be described. In any of the cases of the tether belt 122 shown in FIG. 8(*a*), the tether belt 240 shown in FIG. 13(*a*), and the tether belt 250 shown in FIG. 13(*b*), the second connecting parts 126, 242, and 252 are provided more toward the front of the vehicle than the first connecting part 124. By providing the respective second connecting parts more toward the front of the vehicle than the first connecting part 124, the respective center bags are configured so as to be pulled forward on the vehicle outer side. With this configuration, the head E1 and, particularly, the back of the head E1*b* of the occupant 132 (refer to FIG. 7(*c*) and the like) moving forward on the vehicle inner side can be appropriately restrained by applying, via the center bag, a reaction force which supports the back of the head E1*b* forward on the vehicle outer side.

The respective tether belts described above extend obliquely forward on the vehicle outer side as viewed from the first connecting part 124. However, a direction in which the tether belt extends is not limited thereto. FIG. 12(*a*) illustrates a tether belt 260 which represents a third modification. With the tether belt 260, a second connecting part 262 which connects to the upper part 144 of the passenger bag 112 is provided more toward the vehicle rear side than the first connecting part 124. Therefore, the tether belt 260 is configured so as to extend obliquely rearward on the vehicle outer side as viewed from the first connecting part 124. According to this configuration, the center bag 220 is configured so as to be pulled rearward on the vehicle outer side by the tether belt 260 and the center bag 220 is capable of restraining the head E1 of the occupant 132 (refer to FIG. 7(c) and the like) by applying a reaction force so as to support the head E1 rearward on the vehicle outer side.

Figure 12A:
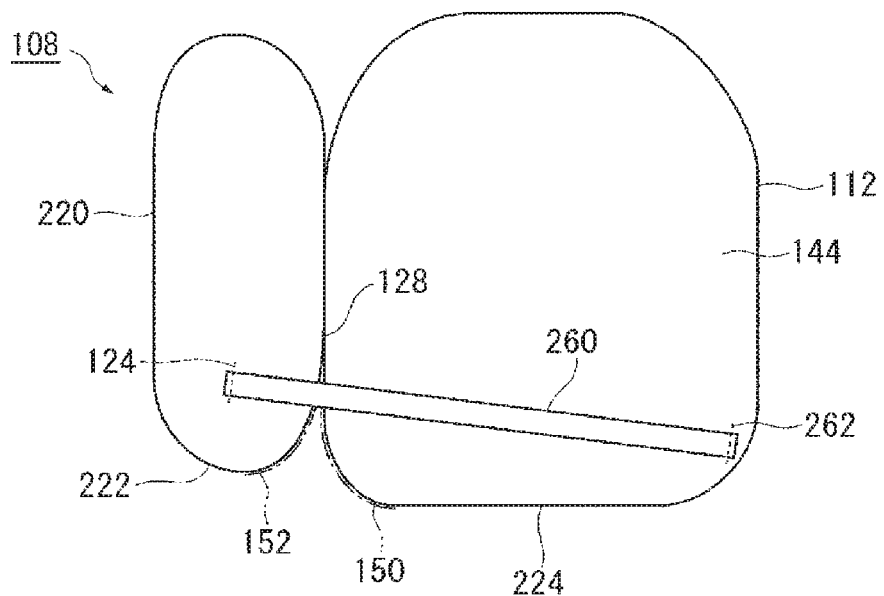
FIGS. 12(a) and (b) are diagrams illustrating a modification of a center bag shown in FIG. 8(a).
Figure 12B:
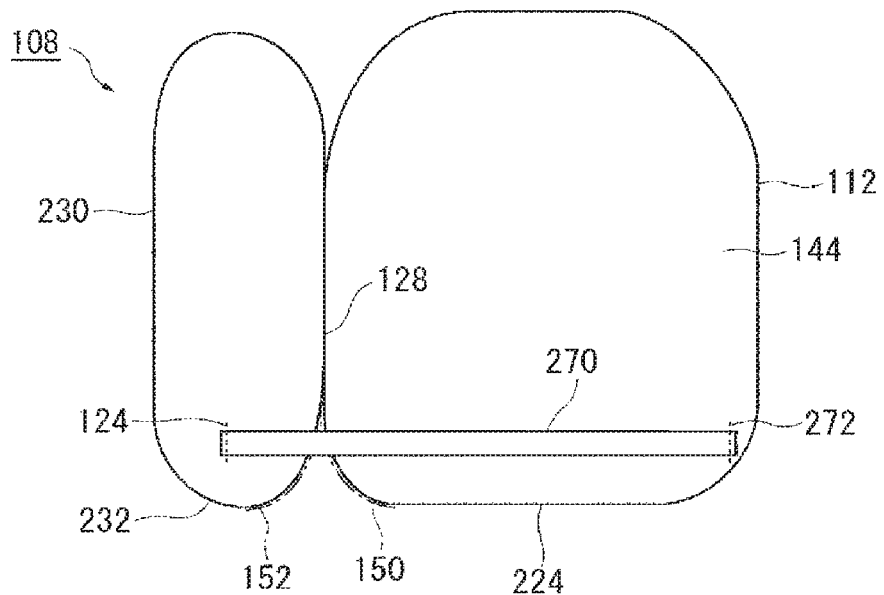

FIG. 12(b) illustrates a tether belt 270 which represents a fourth modification. With the tether belt 270, a second connecting part 272 is provided at a same position in the vehicle longitudinal direction as the first connecting part 124. Accordingly, the tether belt 270 is configured so as to extend in the vehicle width direction. According to this configuration, the center bag 230 is configured so as to be pulled toward the vehicle outer side by the tether belt 270 and the center bag 230 is capable of restraining the head E1 of the occupant 132 (refer to FIG. 7(c) and the like) by applying a reaction force so as to support the head E1 toward the vehicle outer side.

In the description presented above, positions of rear ends of respective center bags with respect to the passenger bag 112 have been described with reference to FIG. 8(a) and FIGS. 12(a) and (b) as modifications of the center bag. In addition, as modifications of the tether belt, lengths of respective tether belts have been described with reference to FIG. 8(a) and FIGS. 13(a) and (b) and directions in which respective tether belts extend have been described with reference to FIG. 12 and FIG. 13. The position of the rear end of the center bag, the length of the tether belt, and the direction in which the tether belt extends can be further modified by appropriately combining those depicted in the respective drawings. For example, while the second connecting part 262 of the tether belt 260 shown in FIG. 12(a) exists on the vehicle outer side of the passenger bag 112, the tether belt 260 can be modified to be shorter by providing the tether belt 260 on the vehicle inner side of the passenger bag 112 or the like. In addition, the second connection 262 can be moved to a front side of the central portion in a width direction on the vehicle outer side of the passenger bag 112 to modify the configuration of the tether belt 260 so as to extend obliquely forward on the vehicle outer side as viewed from the first connecting part 124.

Figure 14A:
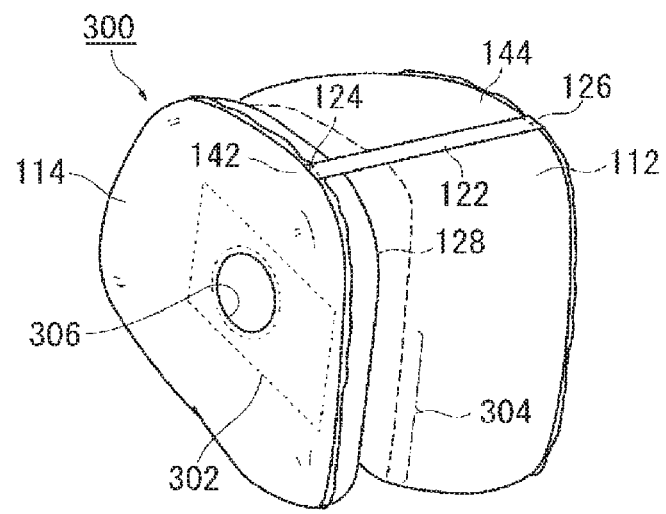
FIGS. 14(a) and (b are diagrams illustrating respective modifications of a cushion shown in FIG. 5(a).

FIGS. 14(a) and (b) are diagrams illustrating modifications of the cushion shown in FIG. 5(a). FIG. 14(a) is a diagram illustrating a first modification (a cushion 300) of the cushion 108 shown in FIG. 5(a). Lower parts 304 of the center bag 114 and the passenger bag 112 included in the cushion 300 may be connected to each other by a sewn part 302 inside the cushion 300. For example, the cushion 300 is provided with the sewn part 302 in a periphery of an internal vent hole 306 connecting the center bag 114 and the passenger bag 112 to each other. In this configuration, the tie panel 120 shown in FIG. 5(a) is not required. By integrating the lower parts 304 of the center bag 114 and the passenger bag 112 with the sewn part 302, the slit 128 is configured so as to exist on an upper part side of the cushion 300. According to this configuration, the chest E4 or the shoulder E3 of the occupant 132 can be appropriately restrained by the lower part 304 of the cushion 300 having been integrated by the sewn part 302 while enabling the head E1 of the occupant 132 to be restrained by the slit 128.

Figure 14B:
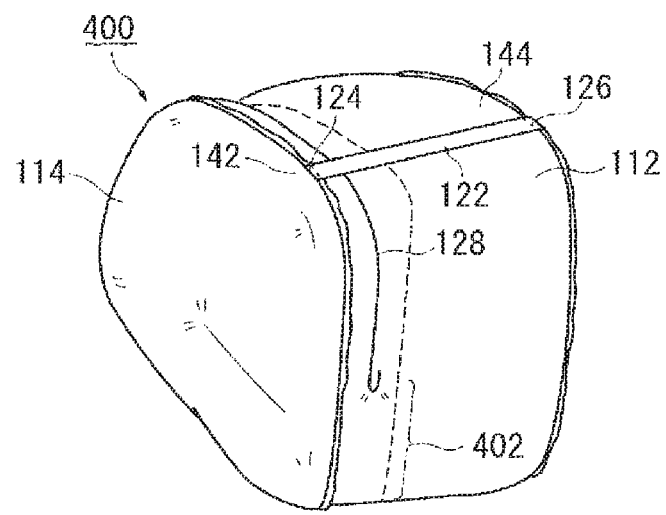

FIG. 14(b) is a diagram illustrating a second modification (a cushion 400) of the cushion 108 shown in FIG. 5(a). With the cushion 400, the center bag 114 and the passenger bag 112 are structurally integrated at lower parts 402 thereof. The slit 128 is provided so as to be geometrically limited from above to a center of the cushion 400. Even with the cushion 400, the chest E4 or the shoulder E3 of the occupant 132 can be restrained by the lower part 402 in which the center bag 114 and the passenger bag 112 are integrated while restraining the head E1 of the occupant 132 with the passenger bag 112 and the slit 128.

Even with the cushion 300 shown in FIG. 14(a) and the cushion 400 shown in FIG. 14(b), as described with reference to FIG. 10, a configuration can be realized which gives consideration to preventing the head E1 of the occupant 132 from coming into contact with a portion that becomes a bottom of the slit 128.

In addition, as a further modification, for example, a case is conceivable where a passenger bag and a center bag are independent bag-shaped parts and respectively include a separate housing and a separate inflator. Furthermore, there is also a case where a mutually independent passenger bag and center bag respectively include a separate inflator but are housed in a same single housing. Even with cushions configured as described above, the slit 128, the tether belt 122, and the like can be provided and functions similar to those of the cushion 108 and the like described above can be realized.

Figure 15A:
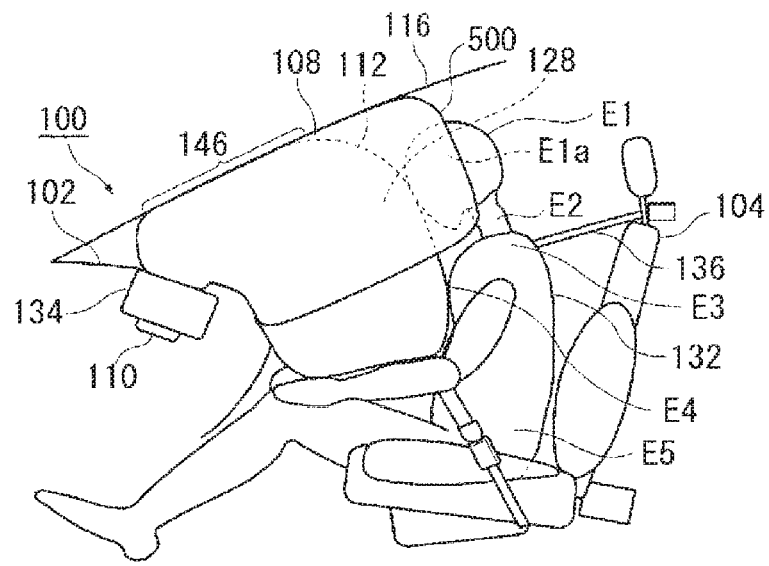
FIGS. 15(a) and (b) are diagrams illustrating a further modification of a center bag shown in FIG. 6(c).

FIGS. 15(a) and (b) are diagrams illustrating a further modification of the center bag shown in FIG. 6(c). FIG. 15(a) is a diagram illustrating a center bag 500 which represents a third modification as viewed from the vehicle inner side. As illustrated in FIG. 15(a), the center bag 500 is configured so as to have a smaller shape in the vertical direction as compared to the passenger bag 112 and to have a reduced downward-side area. The center bag 500 is specialized to restrain only the side of the head E1a of the occupant 132 and is configured so as to hardly come into contact with the shoulder E3 and the chest E4 of the occupant 132.

Figure 15B:
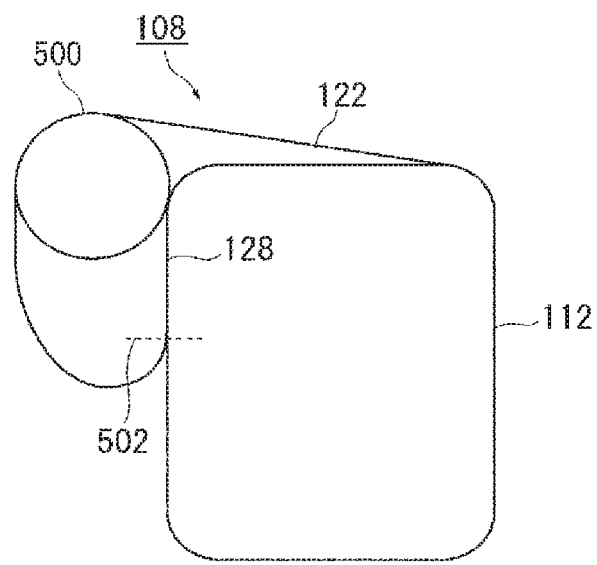

FIG. 15(b) is a diagram illustrating the center bag 500 in FIG. 15(a) as viewed from the vehicle rear side. As illustrated in FIG. 15(b), the center bag 500 exists on an upper part side on the vehicle inner side of the passenger bag 112 and does not exist on a lower part side of the passenger bag 112. The center bag 500 can be connected to the passenger bag 112 by, for example, a sewn part 502 on the lower part side thereof. The center bag 500 is also configured so as to form the slit 128 with the passenger bag 112 and to guide the head E1 of the occupant 132 (refer to FIG. 15(a)) into the slit 128 to restrain the head E1.

As described above, with the center bag 500, a configuration is adopted which reduces gas capacity and focuses on restraining the side of the head E1a of the occupant 132 (refer to FIG. 15(a)). In other words, the center bag 500 is aimed at restraining the head E1 of the occupant 132 and is shaped so as to only exist in an area which may come into contact with the head E1 of the occupant 132. According to a configuration provided with the center bag 550, a reduction in cost due to a reduction in gas capacity and a reduction in overall size of the cushion 108 can be achieved.

Moreover, even a center bag with a smaller shape than the passenger bag 112 in the vertical direction such as the center bag 500 can be appropriately combined with the modification of the slit described with reference to FIG. 11, the modification of a rear end position of the center bag described with reference to FIGS. 12(a) and (b), and the modification of the tether belt described with reference to FIG. 13 to constitute further modifications.

Hereinafter, the present invention will be described in detail using a passenger seat airbag device as an example. FIG. 16 is a plan view showing a schematic configuration of a vehicle mounted with an airbag device according to the present invention. The airbag device according to the present invention includes an airbag 18 which expands and deploys due to expansion gas upon an occurrence of a collision of the vehicle. The airbag 18 includes: a main bag area 18*a* which deploys to the front of an occupant seated on a seat (for example, a passenger seat) and which restrains a forward movement of the occupant; a sub bag area 18*b* which is positioned in a side part on at least one side of the main bag area and which is capable of suppressing a rotation of the head of the occupant when deployed; and a tether 20 which joins an upper part of the main bag area 18*a* and an upper part of the sub bag area 18*b* with each other. In addition, the tether 20 functions to prevent the main bag area 18*a* and the sub bag area 18*b* from moving in directions separating from each other when the airbag 18 is deployed.

Figure 17A:
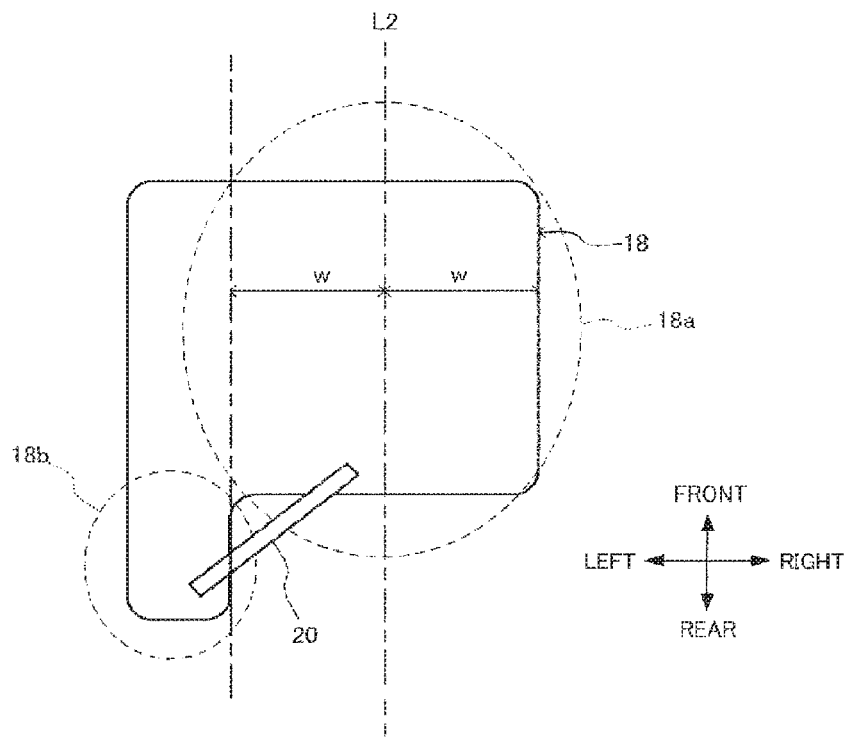
FIGS. 17(a) and (b) are plan views showing an airbag deployed state body in the airbag device according to the first embodiment of the present invention, in which (A) shows a situation immediately after deployment and (B) shows a situation where the head of an occupant has obliquely entered an airbag.

FIGS. 17(*a*) and (*b*) are plan views showing a deployed state body of the airbag 18 in the airbag device according to a second embodiment of the present invention, in which FIG. 17(*a*) shows a situation immediately after deployment and FIG. 17(*b*) shows a situation where the head 12*a* of an occupant 12 has obliquely entered the airbag 18. FIG. 18 is a side view showing an airbag deployed state body in the airbag device according to the second embodiment.

In FIG. 17, a line L2 is a line passing through a center of a passenger seat. The main bag area 18*a* is formed so as to be bilaterally symmetrical with respect to the line L2. The sub bag area 18*b* protrudes more toward the vehicle rearward side than the main bag area 18*a*. According to the configuration described above, a movement of the head of the occupant in the lateral direction can be restrained and, at the same time, a rotation of the head can be suppressed.

With the airbag 18 according to the present embodiment, the main bag area 18*a* and the sub bag area 18*b* are formed as a single bag and the main bag area 18*a* and the sub bag area 18*b* are joined in a fluid and seamless manner. Moreover, a boundary portion can be distinctly formed so that a groove is formed between both bags 18*a* and 18*b*. The sub bag area 18*b* can be formed only in a side part on the vehicle center side of the main bag area 18*a*.

Figure 17B:
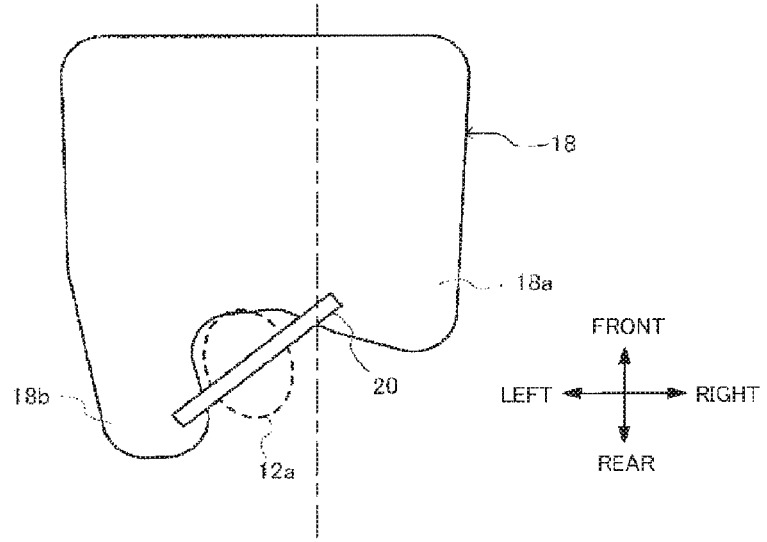

As the tether 20, for example, a tether formed in a band shape from a same base fabric as the airbag 18 can be used, in which case both ends of the tether 20 are fixed to the airbag by sewing. An arrangement angle of the tether 20 can be set to, for example, approximately 45 degrees relative to the line L2. As shown in FIG. 17(B), due to the existence of the tether 20, even when the head 12*a* of the occupant comes into contact near an inner-side surface of the sub bag area 18*b*, the sub bag area 18*b* can be prevented from spreading toward the outer side, the head 12*a* of the occupant can be restrained and prevented from colliding with a center console and, at the same time, a rotation of the head can be suppressed.

Figure 19:
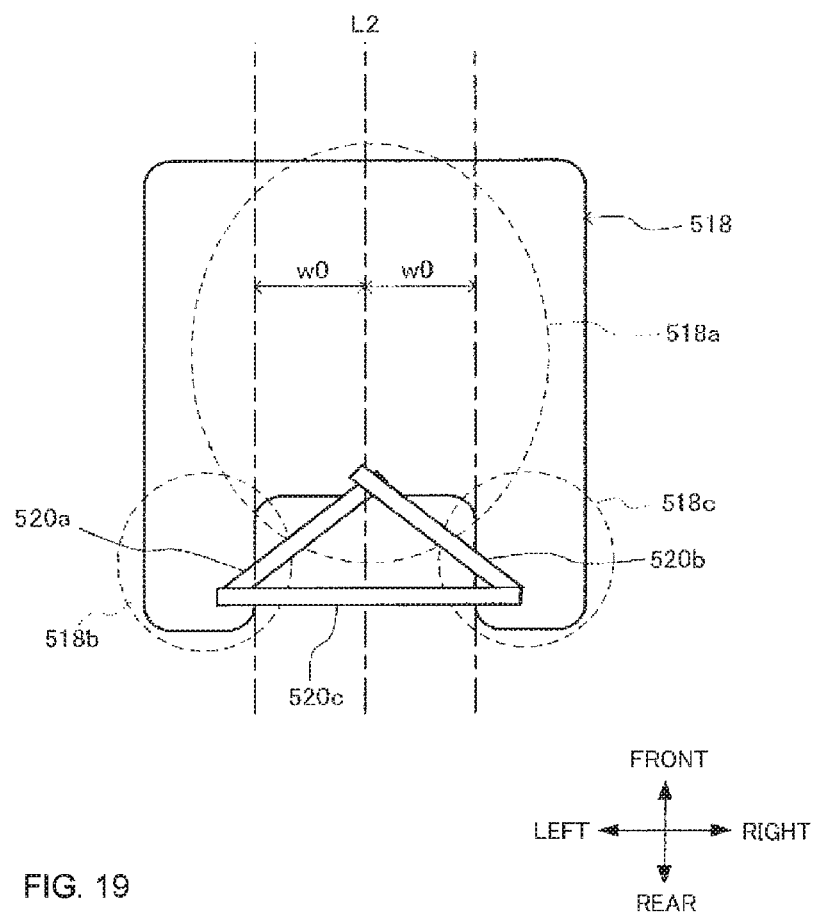
FIG. 19 is a plan view showing an airbag deployed state body in an airbag device according to a second embodiment of the present invention.

FIG. 19 is a plan view showing a deployed state body of an airbag 518 in an airbag device according to a third embodiment of the present invention. In the present embodiment, a sub bag area (518*b*) is constituted by a first chamber 518*b* and a second chamber 518*c* which are joined to left and right side parts of a main bag area 518*a*. The sub bag areas 518*b* and 518*c* are arranged and formed on both sides of the main bag area 518*a*.

The main bag area 518*a* and the first chamber 518*b* are joined by a first tether 520*a* and the main bag area 518*a* and the second chamber 518*c* are joined by a second tether 520*b*. Furthermore, the left and right first and second chambers (518*b* and 518*c*) which constitute the sub bag area are joined to each other by a third tether 520*c*. These three tethers 520*a*, 520*b*, and 520*c* are arranged so as to form an isosceles triangle, and ends of each tether are fixed by sewing to a corresponding bag.

In the present embodiment, since the sub bag areas 518*b* and 518*c* are arranged and formed on both sides of the main bag area 518*a*, even when the vehicle rotates in either direction (clockwise or counterclockwise) upon a collision, a movement of the occupant in the lateral direction and a rotation of the head of the occupant can be restrained. In addition, due to the third tether 520*c*, the first chamber 518*b* and the second chamber 518*c* can be further prevented from spreading toward both left and right sides.

Figure 20A:
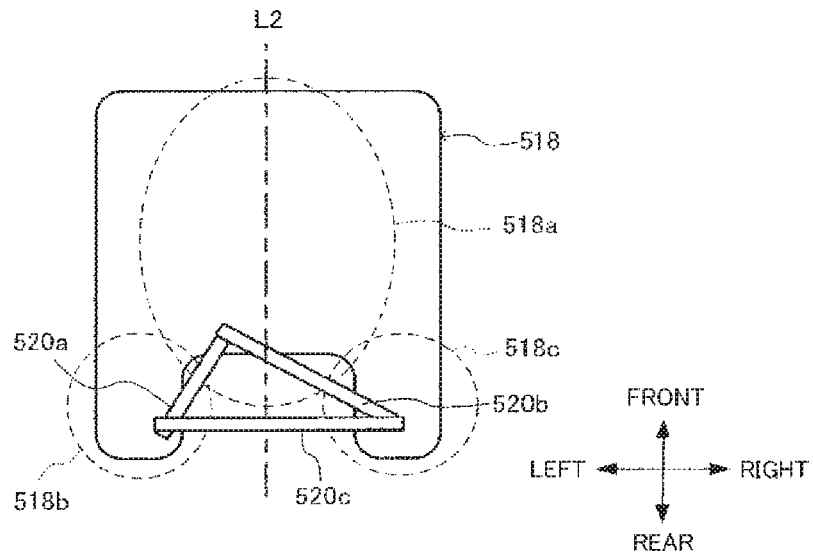
FIGS. 20(a) and 20(b) are plan views showing an airbag deployed state body in airbag devices according to third and fourth embodiments of the present invention.
Figure 20B:
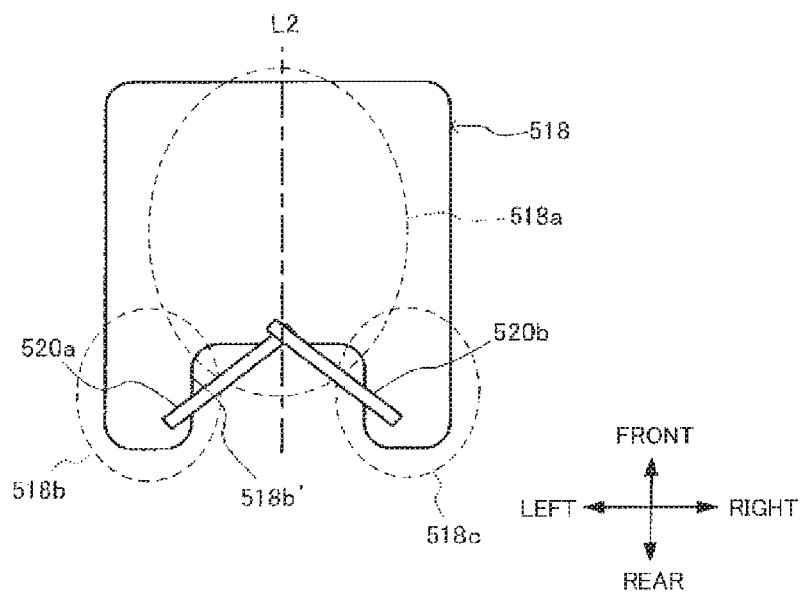

FIGS. 20(*a*) and 20(*b*) are plan views showing an airbag deployed state body in airbag devices according to fourth and fifth embodiments of the present invention. Moreover, the fourth and fifth embodiments can be described as modifications in which a tether structure of the third embodiment shown in FIG. 19 has been changed.

First, in the fourth embodiment shown in FIG. 20(*a*), a point where the first tether 520*a* and the second tether 520*b* intersect each other on the main bag area 518*a* is offset from the line L2 toward a left side (a side of the center console). When the occupant approaches obliquely forward toward the side of the center console, spreading of the first chamber 518*b* can be suppressed and the head 12*a* of the occupant can be protected reliably.

First, in the fifth embodiment shown in FIG. 20(*b*), the third tether 520*c* according to the third embodiment described earlier is omitted. By keeping the number of tethers to a necessary minimum, a structure can be simplified and cost can be reduced. Furthermore, since sub bag areas (first and second chambers 518*b* and 518*c*) on both sides can move relatively freely towards inner sides, for example, when the head 12*a* of the occupant comes into contact with an inner-side surface (518') of the left-side first chamber 518*b*, it is expected that the second chamber 518*c* deforms toward the inner side in conjunction with a movement of the first chamber 518*b* to protect the back of the head of the occupant.

Figure 21A:
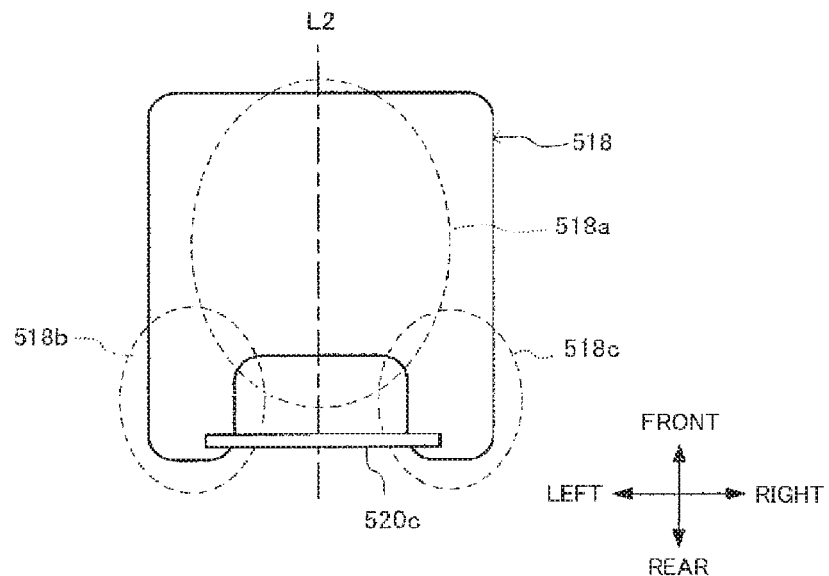
FIGS. 21(a) and 21(b) are plan views showing an airbag deployed state body in airbag devices according to fifth and sixth embodiments of the present invention.
Figure 21B:
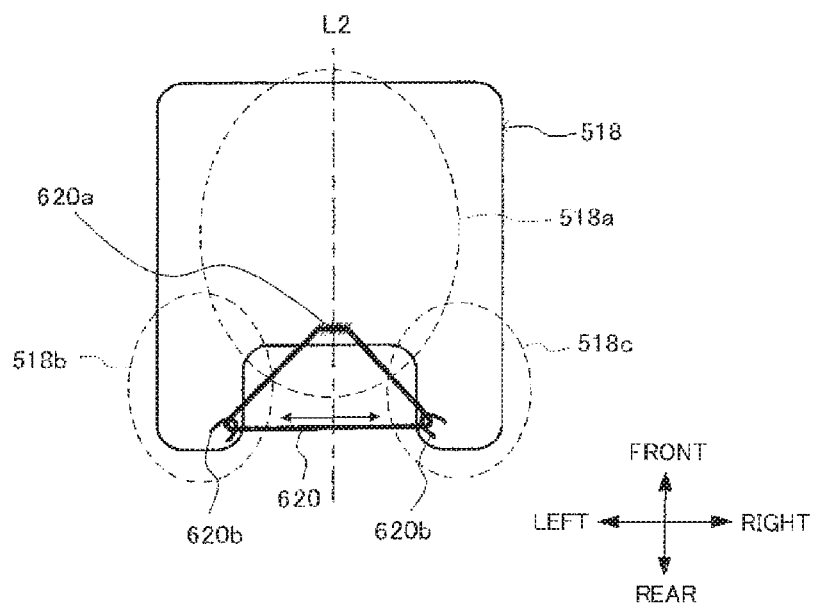

FIGS. 21((*a*) and 21(*b*) are plan views showing an airbag deployed state body in airbag devices according to sixth and seventh embodiments of the present invention. Moreover, the sixth and seventh embodiments can be described as modifications in which a tether structure of the third embodiment shown in FIG. 19 has been changed.

The sixth embodiment shown in FIG. 21(*a*) only adopts the third tether 520*c* according to the third embodiment described earlier. By keeping the number of tethers to a necessary minimum, a structure can be simplified and cost can be reduced.

The seventh embodiment shown in FIG. 21(*b*) refines a joining structure of the tether according to the third embodiment described earlier. In the present embodiment, a single tether 620 is used, whereby the tether is fixed by a sewn part 620*a* of the main bag area 518*a* and, at the same time, the tether is movably supported by a loop-shaped hook 620*b* above the first and second chambers 518*b* and 518*c*. As the hook 620*b*, a hook created by fixing, by sewing, both ends of a string formed in a U-shape from a same fabric as the tether 620 to an upper part of a corresponding chamber can be adopted. The tether 620 is to be passed through the hook 620*b*.

In a similar manner to the fifth embodiment shown in FIG. 20(*b*), the sub bag areas (first and second chambers 518*b* and 518*c*) on both sides can move freely within a length of the tether 620 so that a triangle formed by the tether 620 deforms in a distorted manner. For example, when the head 12*a* of the occupant comes into contact with an inner-side surface of the left-side first chamber 518*b*, it is expected that a reaction thereof causes the second chamber 518*c* on the opposite side to deform toward the inner side to protect the back of the head of the occupant. In other words, regardless of which of the left and right chambers (518*b* and 518*c*) the head of the occupant comes into contact with, a shape of the airbag 518 changes flexibly following the contact and the occupant can be protected.

While preferred practical examples of the present invention have been described above with reference to the accompanying drawings, the embodiments presented above merely represent favorable examples of the present invention and other embodiments can also be performed or implemented using various methods. In particular, unless it is described in the present specification that restrictions apply, the present invention is not restricted to a detailed shape, size, configuration and arrangement, and the like of components illustrated in the accompanying drawings. Furthermore, the expressions and terms in the present specification have been used for explanatory purposes and are not restrictive unless it is specifically described in the present specification that restrictions apply.

Therefore, it will be obvious to those skilled in the art that various modifications or corrections may be made without departing from the scope of the claims, and it is to be understood that such modifications and corrections will also fall within the technical scope of the present invention.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for restraining an occupant on a passenger seat of a vehicle, the airbag device comprising:
   a passenger bag, which expands upon deployment on a front side of the passenger seat;
   a center bag, which expands upon deployment on an inner side in a vehicle width direction of the passenger bag;
   a slit, which separates the passenger bag upon deployment from the center bag upon deployment on a vehicle rearward side; and
   a tether belt, which has a band shape and is connected to a first connecting part in an upper part of the center bag upon deployment on a vehicle rear side and to a second connecting part in an upper part of the passenger bag upon deployment,
   wherein the tether belt is tensioned as the passenger bag and the center bag expand during the deployment such that the first connecting part and the second connecting part move in directions separating from each other, and the center bag is positioned to restrain a side of the head of the occupant while being supported by the tether belt,
   wherein the second connecting part is provided in an outer side portion, in the vehicle width direction, of the upper part of the passenger bag.

2. The airbag device according to claim 1, wherein the center bag is provided so as to protrude more toward the vehicle rear side than the passenger bag upon deployment.

3. The airbag device according to claim 1, wherein the passenger bag is provided so as to protrude more toward the vehicle rear side than the center bag.

4. The airbag device according to claim 1, wherein a rear end of the center bag is provided at a same position as a rear end of the passenger bag in a vehicle longitudinal direction.

5. The airbag device according to claim 1, wherein the second connecting part is provided in an inner side portion, in the vehicle width direction, of the upper part of the passenger bag.

6. The airbag device according to claim 1, wherein the second connecting part is provided in a central portion, in the vehicle width direction, of the upper part of the passenger bag.

7. The airbag device according to claim 1, wherein the second connecting part is provided more toward a vehicle front side than the first connecting part upon deployment.

8. The airbag device according to claim 1, wherein the second connecting part is provided more toward the vehicle rear side than the first connecting part upon deployment.

9. The airbag device according to claim 1, wherein the second connecting part is provided at a same position as the first connecting part in a vehicle longitudinal direction upon deployment.

10. An airbag device for restraining an occupant on a passenger seat of a vehicle, the airbag device comprising:
    a passenger bag, which expands upon deployment on a front side of the passenger seat;
    a center bag, which expands upon deployment on an inner side in a vehicle width direction of the passenger bag;
    a slit, which separates the passenger bag upon deployment from the center bag upon deployment on a vehicle rearward side; and
    a tether belt, which has a band shape and is connected to a first connecting part in an upper part of the center bag upon deployment on a vehicle rear side and to a second connecting part in an upper part of the passenger bag upon deployment,
    wherein the tether belt is tensioned as the passenger bag and the center bag expand during the deployment such that the first connecting part and the second connecting part move in directions separating from each other, and the center bag is positioned to restrain a side of the head of the occupant while being supported by the tether belt,
    wherein the passenger bag is configured to come into contact with a windshield of the vehicle and with an upper surface of an instrument panel of the vehicle upon deployment.

11. The airbag device according to claim 1, wherein the second connecting part is provided within a contact area where the passenger bag is configured to contact the windshield.

12. The airbag device according to claim 1, wherein the passenger bag and the center bag are integrated below the slit.

13. The airbag device according to claim 1, wherein the center bag upon deployment has a smaller shape in a vertical direction than the passenger bag upon deployment.

14. The airbag device according to claim 1, further comprising:
    a housing, which has a box shape and houses the passenger bag and the center bag on an inner side of an upper surface of an instrument panel of the vehicle,
    wherein the passenger bag and the center bag upon deployment breach the upper surface of the instrument panel.

15. An airbag device, which restrains an occupant inside a vehicle, the airbag device comprising:
    an airbag, which expands upon deployment due to expansion gas during an occurrence of a collision of the vehicle, wherein the airbag includes:

a main bag area, which upon deployment deploys to the front of an occupant seated on a seat and which restrains a forward movement of the occupant;

a sub bag area, which is positioned in a side part on at least one side of the main bag area and is capable of suppressing a rotation of the head of the occupant when deployed; and a tether, which joins an upper part of the main bag area upon deployment and an upper part of the sub bag area upon deployment with each other, wherein the tether functions to prevent the main bag area and the sub bag area from moving in directions separating from each other upon deployment of the airbag, wherein the main bag area and the sub bag area are in fluid communication with each other within a single bag.

16. The airbag device according to claim 15, wherein the sub bag area protrudes more toward a vehicle rearward side than the main bag area upon deployment.

17. The airbag device according to claim 15, wherein the sub bag area is formed only in a side part on the vehicle center side of the main bag area.

18. The airbag device according to claim 15, wherein the sub bag area is constituted by a first chamber and a second chamber respectively joined to left and right side parts of the main bag area.

19. The airbag device according to claim 15, wherein the tether is a first tether joining the main bag area and the first chamber to each other, and further comprising a second tether joining the main bag area and the second chamber to each other.

20. The airbag device according to claim 19, wherein the tether includes a third tether joining the first chamber and the second chamber to each other.

21. The airbag device according to claim 20, wherein ends of the first tether, the second tether, and the third tether are fixed by sewing to respectively corresponding bags.

22. The airbag device according to claim 20, wherein the first tether, the second tether, and the third tether are arranged so as to form a triangle when viewed from above the vehicle upon deployment of the airbag, and the first tether, the second tether, and the third tether are fixed by sewing in the upper part of the main bag area but are slidably supported in upper parts of the first and second chambers of the sub bag area.

* * * * *